(12) United States Patent
Lee et al.

(10) Patent No.: US 10,574,895 B2
(45) Date of Patent: Feb. 25, 2020

(54) IMAGE CAPTURING METHOD AND CAMERA EQUIPPED ELECTRONIC DEVICE

(71) Applicant: Samsung Electronics Co., Ltd., Suwon-si, Gyeonggi-do (KR)

(72) Inventors: Jeong-Won Lee, Seongnam-si (KR); Jae-Joon Moon, Anyang-si (KR); Han-Sung Kim, Seongnam-si (KR); Jae-Hyoung Park, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 152 days.

(21) Appl. No.: 15/833,580

(22) Filed: Dec. 6, 2017

(65) Prior Publication Data

US 2018/0198982 A1 Jul. 12, 2018

(30) Foreign Application Priority Data

Jan. 6, 2017 (KR) .................. 10-2017-0002506

(51) Int. Cl.
*H04N 7/18* (2006.01)
*H04N 5/232* (2006.01)
*H04N 5/14* (2006.01)

(52) U.S. Cl.
CPC ..... *H04N 5/23293* (2013.01); *H04N 5/23219* (2013.01); *H04N 5/23238* (2013.01); *H04N 5/23258* (2013.01); *H04N 5/144* (2013.01)

(58) Field of Classification Search
CPC ................................. H04N 5/23293
USPC ........................................ 348/37
See application file for complete search history.

(56) References Cited

U.S. PATENT DOCUMENTS

| 6,564,004 | B1* | 5/2003 | Kadono | H04N 5/783 386/314 |
| 9,106,821 | B1* | 8/2015 | Baldwin | H04N 5/23219 |
| 9,158,604 | B1* | 10/2015 | Christodorescu | G06F 9/54 |
| 9,195,880 | B1* | 11/2015 | Levoy | G06K 9/00496 |
| 9,288,374 | B1* | 3/2016 | Cooper | H04N 5/232 |
| 9,716,825 | B1* | 7/2017 | Manzari | H04N 5/23216 |
| 2004/0157647 | A1* | 8/2004 | Takahashi | H04M 1/021 455/566 |
| 2006/0262365 | A1* | 11/2006 | Imao | H04N 5/232 358/527 |

(Continued)

FOREIGN PATENT DOCUMENTS

| EP | 2779621 A1 | 9/2014 |
| EP | 2945366 A1 | 11/2015 |

(Continued)

*Primary Examiner* — Leron Beck
(74) *Attorney, Agent, or Firm* — Jefferson IP Law, LLP

(57) ABSTRACT

Methods for capturing images using camera-equipped electronic devices and electronic devices are provided. The electronic device includes a display, a camera, at least one sensor, and a processor electrically connected with the display, the camera, and the at least one sensor, wherein the processor is configured to receive a signal for obtaining an image, obtain a preview image through the camera in response to the received signal, identify a first motion of the electronic device through the at least one sensor while the preview image obtained through the camera is displayed through the display, and control the electronic device based on the identified first motion and the preview image.

20 Claims, 16 Drawing Sheets

(56) References Cited

U.S. PATENT DOCUMENTS

| | | | | |
|---|---|---|---|---|
| 2007/0268965 A1* | 11/2007 | Alfonso | ............... | H04N 7/0105 375/240.01 |
| 2008/0124005 A1* | 5/2008 | Lin | ............... | G06F 3/017 382/313 |
| 2009/0091554 A1* | 4/2009 | Keam | ............... | G06F 3/0421 345/175 |
| 2009/0103609 A1* | 4/2009 | Jiang | ............... | H04N 19/152 375/240.03 |
| 2009/0244296 A1* | 10/2009 | Petrescu | ............... | H04N 5/23219 348/207.99 |
| 2010/0149353 A1 | 6/2010 | Jang et al. | | |
| 2010/0295772 A1* | 11/2010 | Alameh | ............... | G06F 3/0304 345/156 |
| 2010/0295781 A1* | 11/2010 | Alameh | ............... | G06F 3/017 345/158 |
| 2011/0037777 A1* | 2/2011 | Lindahl | ............... | G06F 1/1626 345/619 |
| 2011/0216209 A1* | 9/2011 | Fredlund | ............... | G06F 21/32 348/211.99 |
| 2012/0045103 A1* | 2/2012 | Salsman | ............... | G01N 15/1012 382/128 |
| 2012/0057062 A1* | 3/2012 | Hamada | ............... | G02B 7/102 348/333.02 |
| 2012/0200761 A1 | 8/2012 | Lim et al. | | |
| 2013/0012264 A1* | 1/2013 | Mitsunaga | ............... | G01C 21/20 455/556.1 |
| 2013/0304869 A1* | 11/2013 | Gupta | ............... | G06F 9/541 709/219 |
| 2013/0329014 A1* | 12/2013 | Obata | ............... | H04M 1/72522 348/46 |
| 2014/0192247 A1* | 7/2014 | Cheong | ............... | G06F 3/011 348/333.11 |
| 2014/0232905 A1* | 8/2014 | Jung | ............... | H04N 5/265 348/239 |
| 2014/0232906 A1* | 8/2014 | Ha | ............... | H04N 5/265 348/239 |
| 2014/0232921 A1* | 8/2014 | Kim | ............... | H04N 5/23293 348/333.05 |
| 2015/0049234 A1* | 2/2015 | Jung | ............... | H04N 5/2258 348/333.05 |
| 2015/0153878 A1* | 6/2015 | Kim | ............... | G06F 3/044 345/174 |
| 2015/0172552 A1 | 6/2015 | Kim | | |
| 2015/0242982 A1 | 8/2015 | Choi et al. | | |
| 2015/0304549 A1 | 10/2015 | Lee et al. | | |
| 2015/0350551 A1* | 12/2015 | Harris | ............... | H04N 5/23216 348/231.99 |
| 2016/0219199 A1* | 7/2016 | Streuter | ............... | H04N 5/2251 |
| 2016/0253560 A1* | 9/2016 | Tokutake | ............... | G06F 3/0412 382/103 |
| 2017/0078543 A1* | 3/2017 | Lee | ............... | G02F 1/15 |

FOREIGN PATENT DOCUMENTS

| | | |
|---|---|---|
| JP | 2008-277983 A | 11/2008 |
| KR | 10-0678059 B1 | 2/2007 |
| KR | 10-2012-0090431 A | 8/2012 |
| KR | 10-1603112 B1 | 3/2016 |
| KR | 10-2016-0084208 A | 7/2016 |
| KR | 10-1671137 B1 | 10/2016 |

* cited by examiner

IMAGE CAPTURING METHOD AND CAMERA EQUIPPED ELECTRONIC DEVICE

CROSS-REFERENCE TO RELATED APPLICATION(S)

This application claims the benefit under 35 U.S.C. § 119(a) of a Korean patent application filed on Jan. 6, 2017 in the Korean Intellectual Property Office and assigned Serial number 10-2017-0002506, the entire disclosure of which is hereby incorporated by reference.

TECHNICAL FIELD

The present disclosure relates to methods for capturing images using camera-equipped electronic devices and electronic devices for implementing the same. More particularly, the present disclosure relates to a method for obtaining an image through an electronic device, wherein the method includes receiving a signal for obtaining an image, obtaining a preview image through a camera in response to the received signal, identifying a first motion of the electronic device through at least one sensor while the preview image obtained through the camera is displayed through a display, and controlling the electronic device based on the identified first motion and the preview image.

BACKGROUND

More and more services and additional functions are being provided through smartphones or other portable electronic devices. To meet the needs of various users and raise use efficiency of electronic devices, communication service carriers or device manufacturers are jumping into competitions to develop electronic devices with differentiated and diversified functionalities.

As the capability of electronic devices is enhanced, portable electronic devices come up with a high-performance camera. The user of an electronic device is able to take a high-definition image using the high-performance camera of the electronic device. Further, various image capturing functions of the electronic device can provide a user experience that compact cameras cannot according to the related art. For example, an electronic device with a front camera and a display can offer a 'mirror' function that enables the user to quickly check his/her face.

The above information is presented as background information only to assist with an understanding of the present disclosure. No determination has been made, and no assertion is made, as to whether any of the above might be applicable as related art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for capturing images using camera-equipped electronic devices and electronic devices.

According to the related art, the front camera of the electronic device has a relatively low resolution and smaller view angle than the rear camera. The mirror function that is provided through the front camera cannot give a clear and same-size reflection of the user's actual face on the display as a real mirror does.

Recently, electronic devices come with a higher-resolution, wider-view front camera to support selfie capturing. The wide-view front camera, however, causes the image displayed on the display to shrink as compared with the size of the user's face and thus cannot live up to the user's desire to use it like a real mirror.

In accordance with an aspect of the present disclosure, an electronic device is provided. The electronic device includes a display, a camera, at least one sensor, and a processor electrically connected with the display, the camera, and the at least one sensor, wherein the processor may receive a signal for obtaining an image, obtain a preview image through the camera in response to the received signal, identify a first motion of the electronic device through the at least one sensor while the preview image obtained through the camera is displayed through the display, and control the electronic device based on the identified first motion and the preview image.

In accordance with another aspect of the present disclosure, a method for obtaining an image through an electronic device is provided. The electronic device includes receiving a signal for obtaining an image, obtaining a preview image through a camera in response to the received signal, identifying a first motion of the electronic device through at least one sensor while the preview image obtained through the camera is displayed through a display, and controlling the electronic device based on the identified first motion and the preview image.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
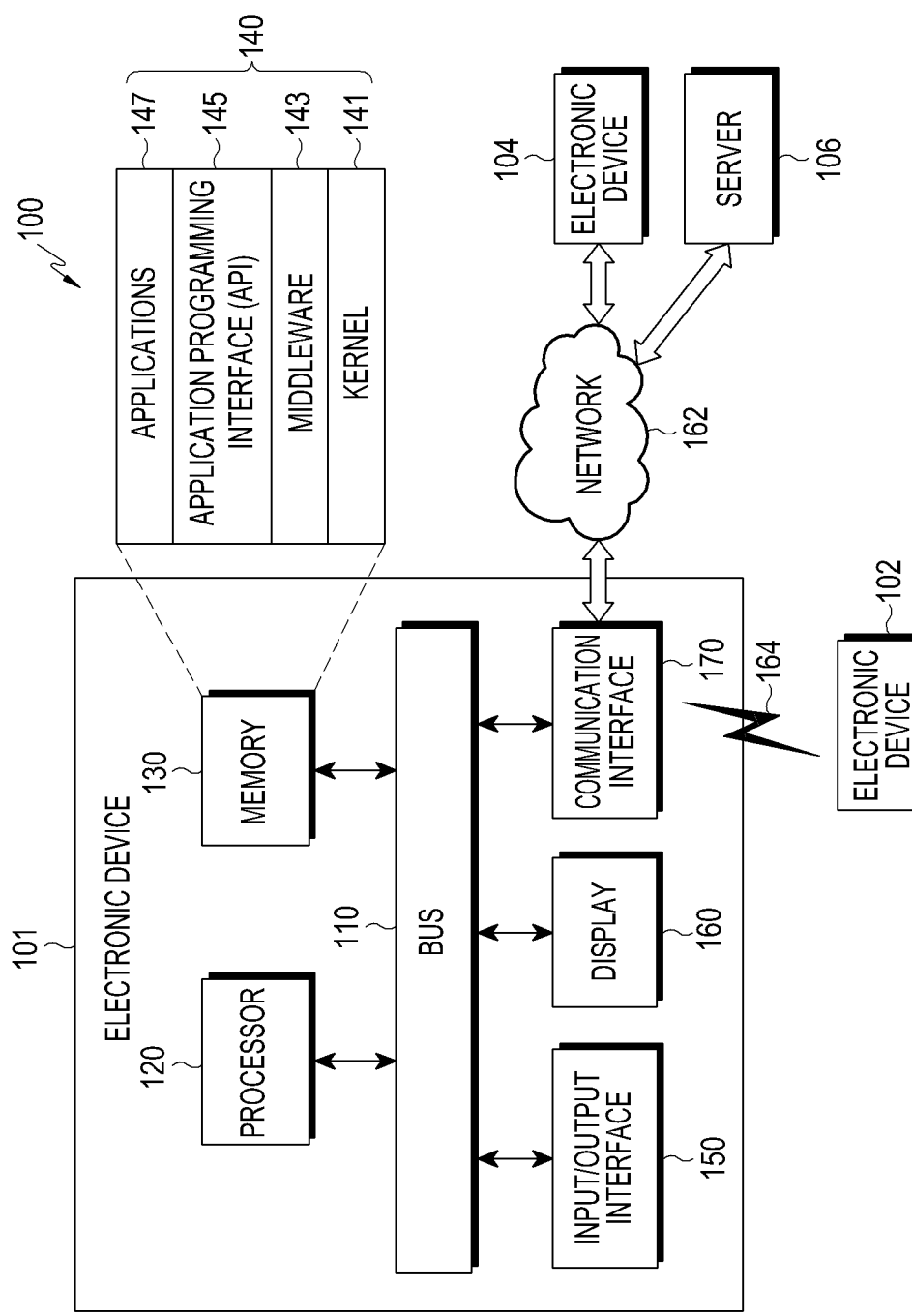
FIG. 1 is a view illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

All changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a moving picture experts group (MPEG-1 or MPEG-2) audio layer 3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments of the present disclosure, examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the present disclosure, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

FIG. 1 is a view illustrating a network environment including an electronic device according to an embodiment of the present disclosure.

Referring to FIG. 1, according to an embodiment of the present disclosure, an electronic device 100 is included in a network environment. An electronic device 101 may include a bus 110, a processor 120, a memory 130, an input/output interface 150, a display 160, and a communication interface 170. In some embodiments of the present disclosure, the electronic device 101 may exclude at least one of the components or may add another component.

The bus 110 may include a circuit for connecting the components 110 to 170 with one another and transferring communications (e.g., control messages or data) between the components.

The processing 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101. According to an embodiment of the present disclosure, the memory 130 may store software and/or a program 140.

The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources. The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control.

For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may set up communication between the electronic device 101 and an external device (e.g., a first external electronic device 102, a second external electronic device 104, or a server 106). For example, the communication interface 170 may be connected with a wireless network 164 to the first external electronic device 102 and may also be connected with a network 162 through wireless communication or wired communication and may communicate with an external device (e.g., the second external electronic device 104 or the server 106).

The wireless communication may include cellular communication which uses at least one of, e.g., long term evolution (LTE), LTE-advanced (LTE-A), code division multiple access (CDMA), wideband CDMA (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), Bluetooth (BT), BT low power (BLE), Zigbee, near field communication (NFC), magnetic secure transmission (MST), radio frequency (RF), or body area network (BAN). According to an embodiment of the present disclosure, the wireless communication may include GNSS. The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first external electronic device 102 and the second external electronic device 104 each may be a device of the same or a different type from the electronic device 101. According to an embodiment of the present disclosure, all or some of operations executed on the electronic device 101 may be executed on another or multiple other electronic devices (e.g., the first external electronic device 102 and the second external electronic device 104 or the server 106). According to an embodiment of the present disclosure, when the electronic device 101 should perform some function or service automatically or at a request, the electronic device 101, instead of executing the function or service on its own or additionally, may request another device (e.g., the first external electronic device 102 and the second external electronic device 104 or the server 106) to perform at least some functions associated therewith. The other electronic device (e.g., the first external electronic device 102 and the second external electronic device 104 or the server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment of the present disclosure, an electronic device may comprise a display (e.g., the display 160 or 260), a camera (e.g., the camera 291), at least one sensor (e.g., the sensor 240), and a processor (e.g., the processor 120 or 210) electrically connected with the display, the camera, and the at least one sensor, wherein the processor may receive a signal for obtaining an image, obtain a preview image through the camera in response to the received signal, identify a first motion of the electronic device through the at least one sensor while the preview image obtained through the camera is displayed through the display, and control the electronic device based on the identified first motion and the preview image.

According to an embodiment of the present disclosure, the processor of the electronic device may obtain a plurality of images for a first object outside the electronic device through the camera based on the identified first motion, identify a slope of the electronic device or a distance between the electronic device and the first object corresponding to a time when some of the plurality of images are obtained, and store information about the slope or the distance in the memory in association with the at least some images.

According to an embodiment of the present disclosure, the processor of the electronic device may change a slope or size of the first object included in the at least some images based on the slope or the distance.

According to an embodiment of the present disclosure, the processor of the electronic device may select one of the plurality of images as a reference image and change a slope or size of the first object included in the at least some images based on the slope or size of the first object included in the selected reference image.

According to an embodiment of the present disclosure, the processor of the electronic device may change a slope or size of the first object included in the at least some images, generate a first image including the at least some images with the slope or size of the first object changed, and display a second image included in the first image through the display.

According to an embodiment of the present disclosure, the processor of the electronic device may identify a second motion of the electronic device through the at least one sensor while the second image is displayed through the display, and change the second image displayed on the display to a third image included in the first image in response to the identified second motion of the electronic device.

According to an embodiment of the present disclosure, the processor of the electronic device may identify a second motion of the electronic device through the at least one sensor while the second image is displayed through the display, and change a size of the second image displayed on the display in response to the identified second motion of the electronic device.

According to an embodiment of the present disclosure, the processor of the electronic device may, when the identified first motion matches a preset second motion, change the preview image obtained through the camera into a first scale and display the changed preview image on the display, and when the identified first motion matches a preset third motion, change the preview image obtained through the camera into a second scale and display the changed preview image on the display.

According to an embodiment of the present disclosure, the processor of the electronic device may determine whether an image of a front face is detected through the camera, when the image of the front face is detected, measure a distance between the electronic device and the front face, resize the detected image of the front face based on the measured distance, and display the resized image of the front face through the display.

Figure 2:
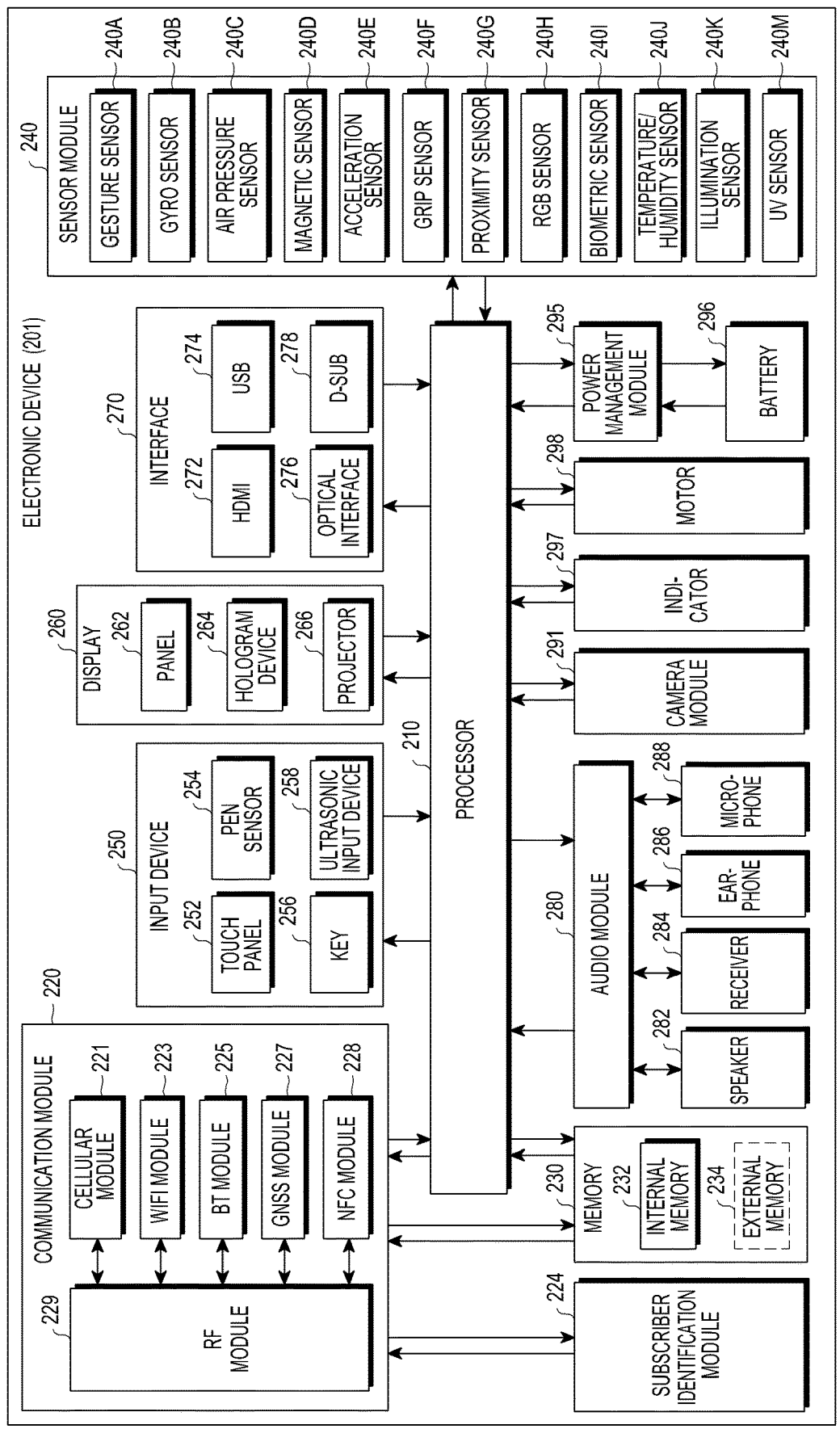
FIG. 2 is a block diagram illustrating an electronic device according to an embodiment of the present disclosure.

FIG. 2 is a block diagram illustrating an electronic device according to an embodiment of the present disclosure.

Referring to FIG. 2, an electronic device 201 may include the whole or part of the configuration of, e.g., the electronic device 101 shown in FIG. 1. The electronic device 201 may include one or more processors (e.g., APs) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an OS or application programs, and the processor 210 may process and compute various data. The processor 210 may be implemented in, e.g., a system on chip (SoC). According to an embodiment of the present disclosure, the processor 210 may further include a graphical processing unit (GPU) and/or an image signal processor (ISP). The processor 210 may include at least some (e.g., a cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., the cellular module 221, a Wi-Fi module 223, a BT module 225, a GNSS module 227, a NFC module 228, and an RF module 229. The cellular module 221 may provide voice call, video call, text, or Internet services through, e.g., a communication network. The cellular module 221 may perform identification or authentication on the electronic device 201 in the communication network using a SIM 224 (e.g., the SIM card). According to an embodiment of the present disclosure, the cellular module 221 may perform at least some of the functions providable by the processor 210. According to an embodiment of the present disclosure, the cellular module 221 may include a CP. According to an embodiment of the present disclosure, at least some (e.g., two or more) of the cellular module 221, the Wi-Fi module 223, the BT module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the BT module 225, the GNSS module 227, or the NFC module 228 may communicate RF signals through a separate RF module. The subscription identification module 224 may include, e.g., a card including a SIM, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), and the like) or a non-volatile memory (e.g., a one-time programmable read only memory (OT-PROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a mini-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, IR, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201.

The interface 270 may include e.g., a HDMI 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a SD card/multimedia card (MMC) interface, or IR data association (IrDA) standard interface.

The audio module 280 may converting, e.g., a sound signal into an electrical signal and vice versa. At least a part of the audio module 280 may be included in e.g., the input/output interface 150 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an embodiment of the present disclosure, one or more image sensors (e.g., front and back sensors), a lens, an ISP, or a flash, such as an LED or xenon lamp.

The power manager module 295 may manage power of the electronic device 201, for example. According to an embodiment of the present disclosure, the power manager module 295 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments of the present disclosure, the electronic device (e.g., the electronic device 201) may exclude some elements or include more elements, or some of the elements may be combined into a single entity that may perform the same function as by the elements before combined.

Figure 3:
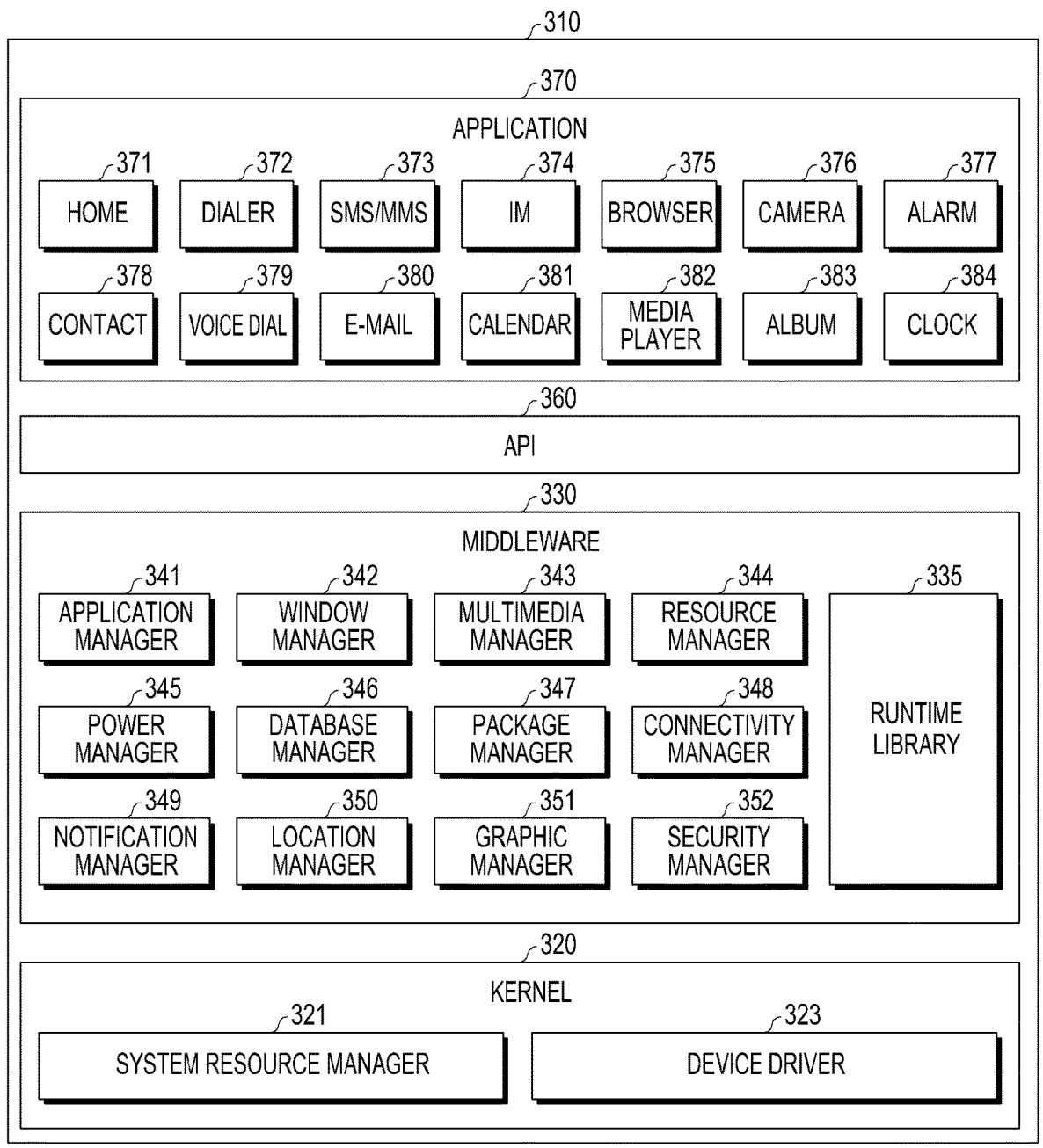
FIG. 3 is a block diagram illustrating a program module according to an embodiment of the present disclosure.

FIG. 3 is a block diagram illustrating a program module according to an embodiment of the present disclosure.

Referring to FIG. 3, according to an embodiment of the present disclosure, a program module 310 (e.g., the program 140) may include an OS controlling resources related to the electronic device (e.g., the electronic device 101) and/or various applications (e.g., the AP 147) driven on the OS. The OS may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the first external electronic device 102 and the second external electronic device 104 or the server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a BT driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the OS. The middleware 330 may dynamically omit some existing components or add new components. The API 360 may be a set of, e.g., API programming functions and may have different configurations depending on OSs. For example, in the case of Android or iOS, one API set may be provided per platform, and in the case of Tizen, two or more API sets may be offered per platform.

The application 370 may include an application that may provide, e.g., a home application 371, a dialer application 372, a short message system (SMS)/multimedia message system (MMS) application 373, an instant message (IM) application 374, a browser application 375, a camera application 376, an alarm application 377, a contact application 378, a voice dial application 379, an email application 380, a calendar application 381, a media player application 382, an album application 383, or a clock application 384, a health-care (e.g., measuring the degree of workout or blood sugar), or provision of environmental information (e.g., provision of air pressure, moisture, or temperature information). According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4:
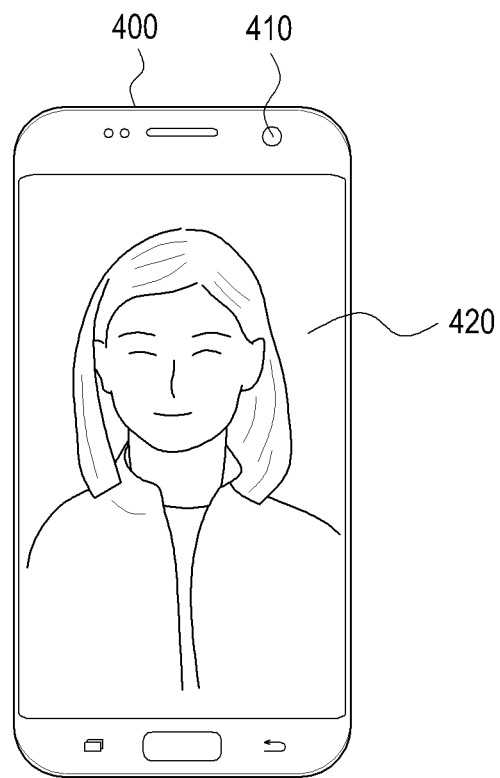
FIG. 4 is a view illustrating an electronic device according to an embodiment of the present disclosure.

FIG. 4 is a view illustrating an electronic device according to an embodiment of the present disclosure.

Referring to FIG. 4, an electronic device 400 (e.g., the electronic device 101, 102, or 201) may include at least one camera 410 (e.g., the camera module 291), a display 420 (e.g., the display 160 or 260), at least one sensor (e.g., the sensor module 240), a memory (e.g., the memory 130 or 230), and a processor (e.g., the processor 120 or 210). The electronic device 400 may include a housing with a first surface facing in a first direction and a second surface facing in a second direction which is an opposite direction of the first direction. The housing may include a transparent cover forming at least part of the first surface. At least one camera 410 may be disposed between the first surface and second surface of the housing. The camera 410 may receive light from the outside through the transparent cover. The display 420 may be disposed between the first and second surface of the housing. The display 420 may display information to the outside through the transparent cover.

The camera 410 of the electronic device 400 may obtain at least one image. The camera 410 may be activated based on a signal corresponding to the execution of the camera and received from the user or a signal corresponding to a motion of the electronic device 400. For example, when the user runs an application that requires execution of the camera, the camera 410 may be activated. When the electronic device 400 senses a preset motion, the camera 410 may be activated. The camera 410 of the electronic device 400 as disclosed herein may be the camera module 291.

According to an embodiment of the present disclosure, the camera 410 of the electronic device 400, upon obtaining at least one image, may receive all light beams present within the view angle of the camera 410 and obtain a first image having a size corresponding to the view angle of the camera 410. The camera 410 of the electronic device 400, upon obtaining at least one image, may receive only some of the light beams present within the view angle and obtain a second image having a size smaller than the size corresponding to the view angle of the camera 410. In this case, the second image may be an image corresponding to a portion of the first image. Upon displaying the first image and the second image through displays with the same size, the second image may be displayed as an enlarged image of a portion of the first image.

According to an embodiment of the present disclosure, the processor of the electronic device 400 may crop at least one image obtained through the camera 410. "Crop" may mean resizing a picture or photo to a desired size. The processor may chop off a portion of the picture or photo for resizing. The processor of the electronic device 400 may display the cropped image through the display 420.

The display 420 of the electronic device 400 may display at least one image obtained through the camera 410. The processor of the electronic device 400 may edit at least one image obtained through the camera 410 to be displayed through the display 420. The at least one image edited may be displayed through the display 420 in real-time. For example, when a mirror function is run on the electronic device 400, the processor may display, in real-time, at least one image obtained through the camera 410.

The display 420 of the electronic device 400 may display a preview image obtained through the camera 410. "Preview image" means an image that is displayed on the display 420 when the user takes an image of at least one object using the camera 410 of the electronic device. The preview image obtained through the camera 410 may be displayed in real-time on the display 420. The user may take an image of at least one object while viewing the preview image displayed on the display 420.

For example, at least one sensor of the electronic device 400 may measure a physical quantity or detect an operation state of the electronic device 400 and convert the measured or detected information into an electrical signal. As disclosed herein, at least one sensor of the electronic device 400 may be the sensor module 240 including various sensors.

According to an embodiment of the present disclosure, the electronic device 400 may include a motion sensor. The motion sensor may sense a motion of the electronic device 400. For example, the motion sensor may include an acceleration sensor (or an accelerometer) for measuring the acceleration of the electronic device 400, a gyro sensor for measuring the angular speed of the electronic device 400, or a geomagnetic sensor for identifying the direction of the geomagnetic field of the electronic device 400.

The memory of the electronic device 400 may store motions preset in relation to a motion of the electronic device 400. For example, the processor may compare a result of sensing the motion of the electronic device 400 with the preset motions. When the result of comparison reveals that the sensed motion matches at least one of the preset motions, the processor may generate a signal corresponding to the preset motion. The processor may execute at least one software programs based on the generated signal or control at least one hardware component of the electronic device 400.

Figure 5:
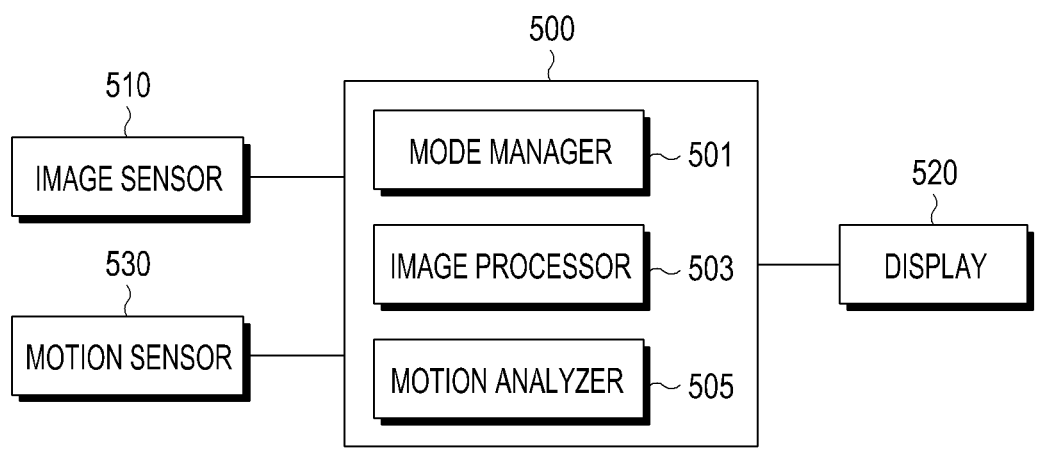
FIG. 5 is a block diagram illustrating components of an electronic device according to an embodiment of the present disclosure.

FIG. 5 is a block diagram illustrating components of an electronic device according to an embodiment of the present disclosure.

Referring to FIG. 5, an electronic device (e.g., the electronic device 101, 102, or 201) may include a processor 500 (e.g., the processor 120 or 210), an image sensor 510 (e.g., the camera module 291), a display 520 (e.g., the display 160 or 260), and a motion sensor 530 (e.g., the sensor module 240).

The processor 500 may include a mode manager 501, an image processor 503, and a motion analyzer 505.

The mode manager 501 may manage a plurality of modes constituting a mirror function that is executed on the electronic device. The mode manager 501 may be divided into a panoramic mode manager, a smart zoom mode manager, and a real-zoom mode manager.

The panoramic mode manager may manage a panoramic mode that is executed through a mirror function of the electronic device. The panoramic mode is a mode in which the motion of the electronic device and the user of the electronic device is sensed, and the surroundings of a particular object are consecutively captured based on the sensed motion of the electronic device and the user of the electronic device. The electronic device may capture the user's body portion that is difficult to view through a mirror. For example, the panoramic mode manager may sense the motion of the electronic device and the user of the electronic device through at least one sensor provided in the electronic device. The panoramic mode manager may compare a result of sensing the motion with motions present for the electronic device. When the sensed motion matches a motion corresponding to a panoramic capture among the preset motions, the panoramic mode manager may execute a panoramic mode. The motion corresponding to the panoramic capture may be a motion that elliptically moves around the particular object. When the panoramic mode is executed, the electronic device may obtain a plurality of continuous images of the surroundings of the particular object. Operations performed in the panoramic mode are described below with references to FIGS. 7A, 7B, 7C, and 7D.

The smart zoom mode manager may manage a smart zoom mode that is executed through a mirror function of the electronic device. The smart zoom mode is a mode in which the motion of the electronic device and the user of the electronic device is sensed, and the image being displayed on the display 520 is resized based on the sensed motion of the electronic device and the user of the electronic device. The smart zoom mode allows the user one-handed resizing of the image being displayed on the display 520. For example, the smart zoom mode manager may sense the motion of the electronic device and the user of the electronic device through at least one sensor provided in the electronic device. The smart zoom mode manager may compare a result of sensing the motion with motions present for the electronic device. When the sensed motion matches a motion corresponding to a smart zoom among the preset motions, the smart zoom mode manager may execute a smart zoom mode. The motion corresponding to the smart zoom may be the user's push-pull motion of the electronic device or the user's pull-push motion of the electronic device. When the smart zoom mode is running, the electronic device may enlarge or shrink the preview image being displayed on the display 520. Operations performed in the smart zoom mode are described below with references to FIGS. 9A and 9B.

The real-zoom mode manager may manage a real-zoom mode that is executed through a mirror function of the electronic device. "Mirror function" may include displaying, through the display 520 of the electronic device, at least one image obtained through the image sensor 510 of the electronic device. The real-zoom mode may mean a basic mode of the mirror function. The real-zoom mode is a mode in which the distance between the electronic device and the user is measured, and the size of a preview image displayed on the display 520 is determined based on the measured distance. The electronic device may provide the user with such a feeling as if he or she uses a real physical mirror. For example, the real-zoom mode manager may measure the distance between the electronic device and the user through at least one sensor provided in the electronic device. The panoramic mode may determine the size of a preview image displayed on the display 520 based on the measured distance. Operations performed in the real-zoom mode are described below with references to FIGS. 10A and 10B.

The image sensor 510 may be a sensor included in the camera (e.g., the camera 410) of the electronic device. The electronic device may obtain at least one image through the image sensor 510. As disclosed herein, the image sensor 510 of the electronic device may be a camera (e.g., the camera 410) or a camera module (e.g., the camera module 291).

The display 520 may display at least one image obtained through the image sensor 510 of the electronic device. The processor of the electronic device may display, in real-time, a preview image obtained through the image sensor 510 on the display 520.

The motion sensor 530 may sense a motion of the electronic device. For example, the motion sensor may include an acceleration sensor, a gyro sensor, or a geomagnetic sensor.

The above embodiments and the terms used therein are not intended to limit the techniques disclosed herein to particular embodiments and should be appreciated as part of various embodiments of the techniques.

Figure 6:
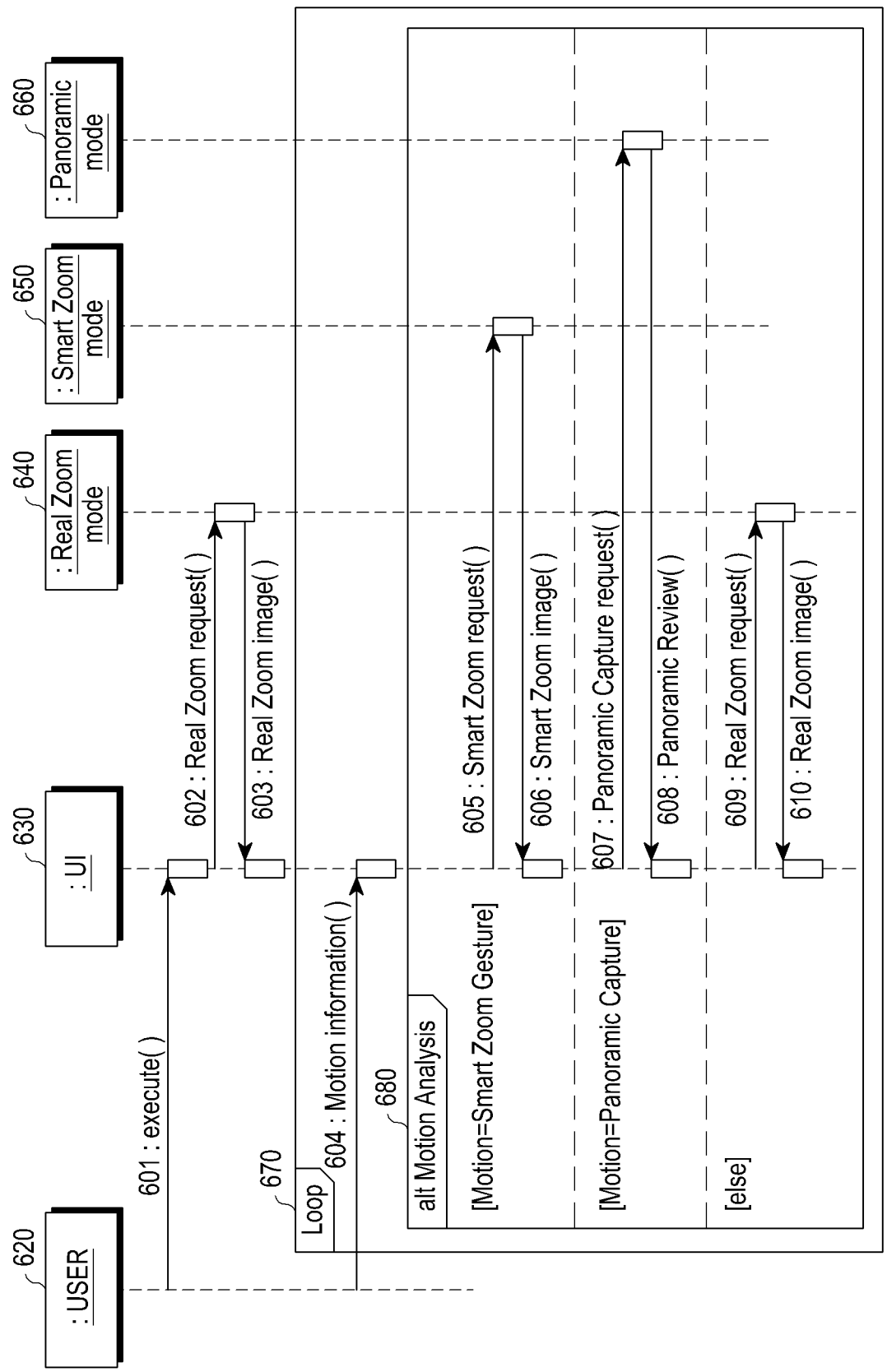
FIG. 6 is a sequence diagram illustrating a process for performing a mirror function by an electronic device according to an embodiment of the present disclosure.

FIG. 6 is a sequence diagram illustrating a process for performing a mirror function by an electronic device according to an embodiment of the present disclosure.

Referring to FIG. 6, an electronic device (e.g., the electronic device 101, 102, or 201) may include a processor (e.g., the processor 120 or 210), an image sensor (e.g., the camera module 291), a display (e.g., the display 160 or 260), and a motion sensor (e.g., the sensor module 240).

The processor may include a mode manager (e.g., the mode manager 501), an image processor (e.g., the image processor 503), and a motion analyzer (e.g., the motion analyzer 505). The mode manager of the processor may include a real-zoom mode manager 640, a smart zoom mode manager 650, and a panoramic mode manager 660. The real-zoom mode manager 640, the smart zoom mode manager 650, and the panoramic mode manager 660 of the processor may mean program modules (e.g., the program module 310) that manage a real-zoom mode, a smart zoom mode, and a panoramic mode, respectively.

According to an embodiment of the present disclosure, the sequence diagram for describing a process for executing a mirror function on the electronic device may include, as objects, a user 620 of the electronic device, a user interface 630, the real-zoom mode manager 640, the smart zoom mode manager 650, and the panoramic mode manager 660. Here, "sequence diagram" is a figure that represents in time sequence messages or data pieces transmitted or received between the objects therein.

In operation 601, the user 620 of the electronic device may execute a mirror function of the electronic device. For example, the electronic device may receive, from the user 620 of the electronic device, a request for installing and/or executing an application including the mirror function. The electronic device may install and/or execute the user interface 630 based on the received request.

In operation 602, the user interface 630 may send a request for executing the real-zoom mode to the real-zoom mode manager 640 of the processor. Upon receiving the request for executing the real-zoom mode from the user interface 630, the real-zoom mode manager 640 may edit at least one image obtained through the image sensor of the electronic device. For example, the real-zoom mode manager 640 may measure the distance between the electronic device and the user of the electronic device through at least one sensor of the electronic device. The real-zoom mode manager 640 may resize at least one image obtained through the image sensor based on the measured distance. The real-zoom mode manager 640 may resize the at least one image obtained through the image sensor into the size of an image shown in a real physical mirror that is positioned as far as the measured distance, allowing the user such a feeling as if he or she uses the real physical mirror.

In operation 603, the real-zoom mode manager 640 of the processor may transmit a real zoom image including the at least one edited image to the user interface 630. The user interface 630 may display the received real zoom image through the display of the electronic device. The real zoom image may be displayed in real-time through the display of the electronic device.

In operation 604, the user interface 630 may identify at least one gesture obtained from the user 620. The user interface 630 may also sense a motion of the electronic device through at least one sensor of the electronic device. For example, the user 620 may make a motion corresponding to the smart zoom mode or the panoramic mode while holding the electronic device in his hand.

When the at least one gesture obtained from the user 620 or the sensed motion of the electronic device matches the motion corresponding to the smart zoom mode, the user interface 630 may send a request for the smart zoom mode to the smart zoom mode manager 650 of the processor in operation 605. Upon receiving the request for executing the smart zoom mode from the user interface 630, the smart zoom mode manager 650 may resize the preview image being displayed on the display of the electronic device. For example, when the at least one gesture obtained or the sensed motion of the electronic device matches a motion for enlarging or shrinking the image being displayed on the display, the smart zoom mode manager 650 may enlarge or shrink the preview image being displayed on the display.

In operation 606, the smart zoom mode manager 650 of the processor may transmit a smart zoom image including the at least one resized image to the user interface 630. The user interface 630 may display the received smart zoom image through the display of the electronic device. The smart zoom image may be displayed in real-time through the display of the electronic device.

When at least one gesture obtained from the user 620 or a sensed motion of the electronic device matches a motion corresponding to the panoramic capture, the user interface 630 may send a request for the panoramic mode to the panoramic mode manager 660 of the processor in operation 607. Upon receiving the request for executing the panoramic mode from the user interface 630, the panoramic mode manager 660 may initiate the panoramic capture for capturing a plurality of images through the image sensor of the electronic device. To that end, the panoramic mode manager 660 may activate the image sensor of the electronic device. The panoramic mode manager 660 may obtain a plurality of images through the activated image sensor. For example, while the electronic device moves in ellipse or circle around a particular object, the panoramic mode manager 660 may obtain a plurality of images related to the particular object through the image sensor of the electronic device. Since the plurality of images obtained are ones obtained while the electronic device moves around the particular object, they may be images obtained by capturing the particular object in different directions.

The panoramic mode manager 660 of the processor may deactivate the image sensor of the electronic device corresponding to stopping the movement of the electronic device in ellipse or circle around the particular object. The panoramic mode manager 660 may deactivate the image sensor of the electronic device upon detecting the front face of the user 620 through the image sensor of the electronic device for a predetermined time or longer. When no further image is obtained as the image sensor is deactivated, the panoramic mode manager 660 may generate panoramic content using the plurality of images obtained while the electronic device moves in circle or ellipse around the particular object. The panoramic content may include all or some of the plurality of images obtained while the electronic device moves in circle or ellipse around the particular object. For example, the panoramic content may be a panoramic image in which the plurality of images obtained while the electronic device moves in circle or ellipse around the particular object are connected together. The panoramic content is described below with reference to FIG. 8.

In operation 608, the panoramic mode manager 660 may transmit a panoramic review image including the panoramic content to the user interface 630. The user interface 630 may display the received panoramic review image through the display of the electronic device.

When at least one gesture obtained from the user 620 or a sensed motion of the electronic device fails to match motions preset for the electronic device, the user interface 630 may send a request for executing the real-zoom mode to the real-zoom mode manager 640 in operation 609. The real-zoom mode may be a basic mode of a mirror function executed on the electronic device. For example, unless at least one gesture obtained from the user 620 or a sensed motion of the electronic device matches the preset motions with the real zoom image received by the user interface 630 as in operation 603, the user interface 630 may maintain the current state (real-zoom mode) while taking no action. In other words, the user interface 630 may keep on the received real zoom image displayed on the display of the electronic device in operation 610.

When the user interface 630 is executed through operation 601, the loop operation 670 may be repeated. The 'alt' operation 680 means a determination operation when there are several alternative conditions. While the loop operation 670 is repeated, the electronic device may perform the 'alt' operation 680 of determining which one of the motions preset for the electronic device matches at least one gesture obtained from the user 620 or a sensed motion of the electronic device.

FIGS. 7A, 7B, 7C, and 7D are views illustrating a process for running a panoramic mode by an electronic device according to an embodiment of the present disclosure.

Figure 7A:
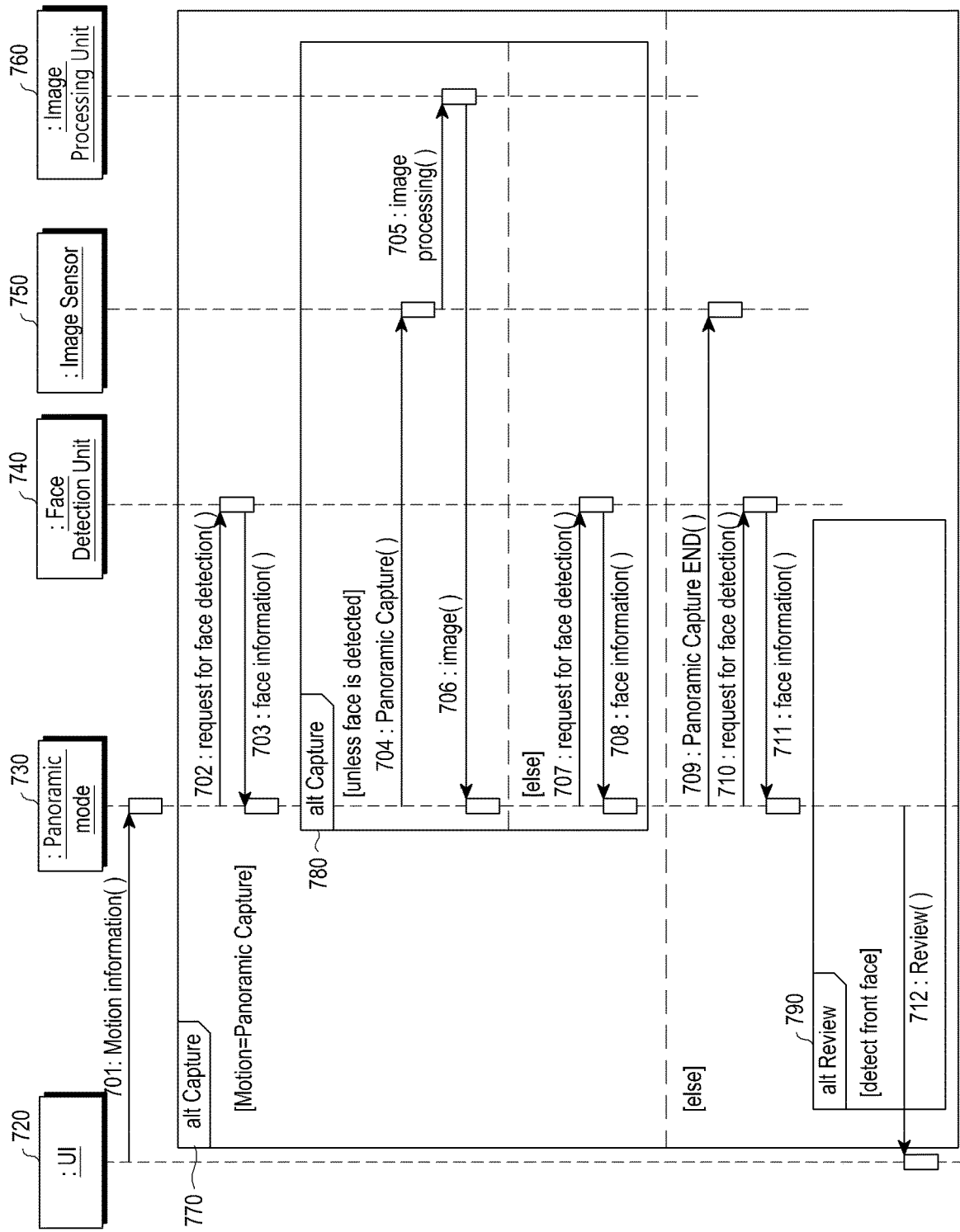
FIGS. 7A, 7B, 7C, and 7D are views illustrating a process for running a panoramic mode by an electronic device according to an embodiment of the present disclosure.

Referring to FIG. 7A, a sequence diagram is illustrated for describing a process in which a panoramic mode is executed according to an embodiment of the present disclosure.

According to an embodiment of the present disclosure, an electronic device (e.g., the electronic device 101, 102, or 201) may include a processor (e.g., the processor 120 or 210), an image sensor 750 (e.g., the camera module 291), a display (e.g., the display 160 or 260), and a motion sensor (e.g., the sensor module 240).

The processor may include a mode manager (e.g., the mode manager 501), a face detector 740, an image processor 760 (e.g., the image processor 503), and a motion analyzer (e.g., the motion analyzer 505). The mode manager of the processor may include a panoramic mode manager 660. The mode manager 660 included in the processor may mean a program module (e.g., the program module 310) for managing the panoramic mode. According to an embodiment of the present disclosure, the sequence diagram for describing the process in which the panoramic mode is executed may include, as objects, a user interface 720, a panoramic mode manager 730, the face detector 740, an image sensor 750, and an image processor 760.

In operation 701, the user interface 720 may transmit information related to a motion of the electronic device to the panoramic mode manager 730. The panoramic mode manager 730 may identify whether the received information related to the motion of the electronic device includes a motion corresponding to a panoramic capture. For example, the motion corresponding to the panoramic capture may be a motion related to the movement of the electronic device in circle or ellipse around a particular object.

The panoramic mode manager 730 may perform the 'alt' operation 770 of identifying whether the received information related to the motion of the electronic device includes a motion corresponding to a panoramic capture. For example, when a motion corresponding to the panoramic capture is identified from the received information related to the motion of the electronic device, the panoramic mode manager 730 may perform operations 702 to 708. In contrast, unless a motion corresponding to the panoramic capture is identified from the received information related to the motion of the electronic device, the panoramic mode manager 730 may perform operations 709 to 711. The 'alt' operation means a determination operation when there are several alternative conditions.

When the motion corresponding to the panoramic capture is identified from the received information related to the motion of the electronic device, operation 702 may be performed. In operation 702, the panoramic mode manager 730 may send a request for face detection to the face detector 740. For example, upon receiving the request for face detection from the panoramic mode manager 730, the face detector 740 may obtain at least one image through the image sensor 750. The face detector 740 may detect a face from at least one image obtained from the image sensor 750 of the electronic device. The face detector 740 may generate face information including information corresponding to the detected face. By contrast, when no face is detected from the image obtained from the image sensor 750 of the electronic device, the face detector 740 may generate face information including information related to no face being detected.

In operation 703, the face detector 740 may transmit the generated face information to the panoramic mode manager 730. The panoramic mode manager 730 may perform the 'alt' operation 780 of determining whether at least one face is detected based on the received face information. For example, when no face is detected, the panoramic mode manager 730 may perform operations 704 to 706. In contrast, when at least one face is detected, the panoramic mode manager 730 may perform operations 707 and 708.

When no face is detected, operation 704 may be performed. In operation 704, the panoramic mode manager 730 may send a request for panoramic capture to the image sensor 750. Upon receiving the panoramic capture, the image sensor 750 may be activated. For example, when the panoramic mode manager 730 sends the request for panoramic capture, the image sensor 750 which used to be inactive may be activated. When the panoramic mode manager 730 sends the request for panoramic capture, the image sensor 750 which used to be active may remain active.

The activated image sensor 750 may obtain a plurality of images. For example, the activated image sensor 750 may obtain a plurality of images based on a preset cycle (or speed). While the electronic device moves in ellipse or circle around a particular object, the image sensor 750 may periodically obtain a plurality of images related to the particular object. Since the plurality of images obtained are ones obtained while the electronic device moves around the particular object, they may be images obtained by capturing the particular object in different directions.

In operation 705, the image sensor 750 may request the image processor 760 to process the plurality of obtained images. To that end, the image sensor 750 may transmit the plurality of obtained images to the image processor 760. The image processor 760 may modify at least part of the plurality of images received from the image sensor 750. For example, the image processor 760 may identify the slope of the electronic device and the distance between the electronic device and the particular object corresponding to the time that each of the plurality of received images is received. The image processor 760 may modify the size and slope of the particular object included in each of the plurality of received images based on the identified slope of the electronic device and distance between the electronic device and the particular object. The image processor 760 may also select one of the plurality of received images as a reference image. The image processor 760 may modify the size and slope of the particular object included in each of the plurality of received images based on the slope and size of the particular object included in the selected reference image.

In operation 706, the image processor 760 may transmit the plurality of images received from the image sensor 750 or the image modified by the image processor 760 to the panoramic mode manager 730. The panoramic mode manager 730 may store the received images in the memory of the electronic device.

When a face is detected, operation 707 may be performed. In operation 707, the panoramic mode manager 730 may send a request for face detection to the face detector 740. Upon receiving the request for face detection from the panoramic mode manager 730, the face detector 740 may obtain at least one image through the image sensor 750. The face detector 740 may detect a face from at least one image obtained from the image sensor 750 of the electronic device. The face detector 740 may generate face information including information corresponding to the detected face. By contrast, when no face is detected from the image obtained from the image sensor 750 of the electronic device, the face detector 740 may generate face information including information related to no face being detected.

In operation 708, the face detector 740 may transmit the generated face information to the panoramic mode manager 730. The panoramic mode manager 730 may re-perform the 'alt' operation 780 of determining whether at least one face is detected based on the received face information. In other words, when it is determined in the 'alt' operation 770 that a motion corresponding to the panoramic capture is identified from the received information related to the motion of the electronic device, the 'alt' operation 780 may be repeated.

Unless the motion corresponding to the panoramic capture is identified from the received information related to the motion of the electronic device, operation 709 may be performed. In operation 790, the panoramic mode manager 730 may transmit information related to the termination of the panoramic capture to the image sensor 750. Upon receiving the information related to the termination of the panoramic capture, the image sensor 750 may be deactivated.

In operation 710, the panoramic mode manager 730 may subsequently send a request for face detection to the face detector 740. For example, upon receiving the request for face detection from the panoramic mode manager 730, the face detector 740 may obtain at least one image through the image sensor 750. The face detector 740 may determine whether a front face is detected from at least one image obtained from the image sensor 750 of the electronic device. When a front face is detected, the face detector 740 may generate face information including information related to the front face.

In operation 711, the face detector 740 may transmit the generated face information to the panoramic mode manager 730. The panoramic mode manager 730 may determine whether the received face information includes the information related to the front face.

When the received face information includes the information related to the front face, the 'alt' operation 790 may be performed. In operation 712, the panoramic mode manager 730 may generate panoramic content using the image modified by the image processor 760 or the plurality of images received from the image sensor 750. The panoramic content may be a panoramic image in which all or some of the images modified by the image processor 760 or the plurality of images received from the image sensor 750 are connected together in order of obtaining. In this case, the plurality of images received from the image sensor 750 or the image modified by the image processor 760 are images stored, in operation 706, in the memory of the electronic device. The panoramic mode manager 730 may transmit the generated panoramic content to the user interface 720. The user interface 720 may display the received panoramic content through the display of the electronic device.

Figure 7B:
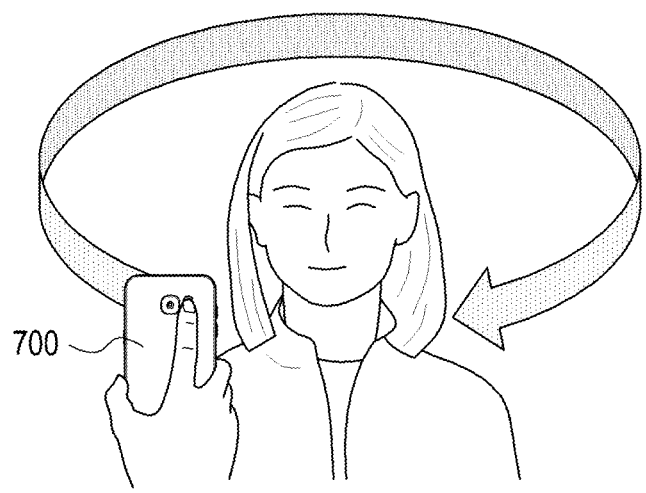

Referring to FIG. 7B, a view illustrates a motion corresponding to a panoramic capture according to an embodiment of the present disclosure.

According to an embodiment of the present disclosure, the user of an electronic device 700 may use a panoramic mode that is executed through a mirror function of the electronic device to capture his/her body portion that cannot be viewed through a real physical mirror.

Figure 7C:
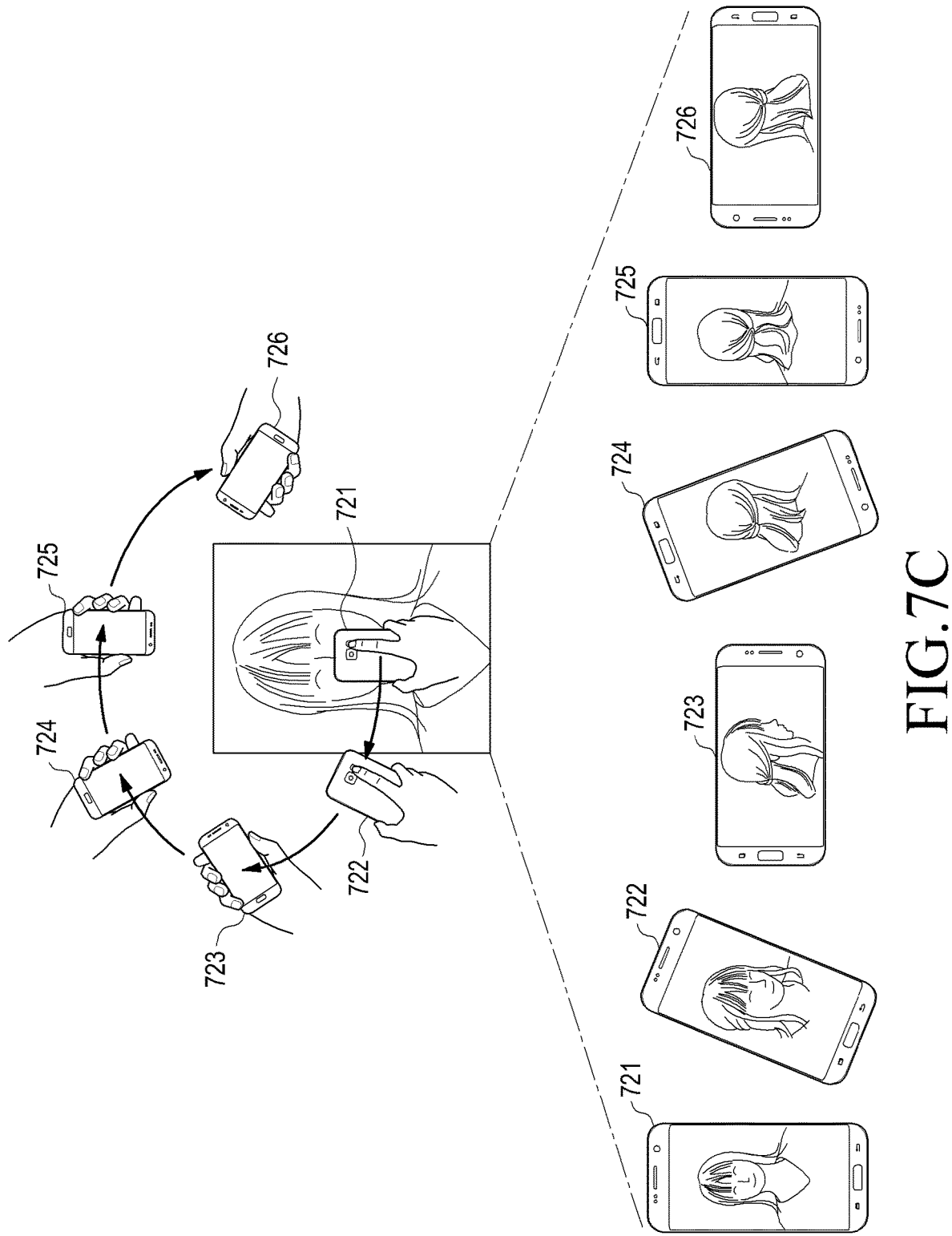

For example, the electronic device 700 may provide the user with images at various angles (e.g., a side or back of the user's head) (through the panoramic mode executed through the mirror function). The electronic device 700 may sense a motion of the electronic device made by the user (e.g., the user's action of moving the electronic device 700 around his/her head while viewing the front camera of the electronic device 700) using, e.g., a sensor. The electronic device 700 may sense the motion of the electronic device using the sensor and obtain an image corresponding to the user's face based on the motion or rotation of the electronic device. The electronic device may obtain an image at each preset cycle until the user's front face is detected (e.g., until the return of the electronic device to the position where the capture has begun is detected through the sensor). FIG. 7C stepwise illustrates the instant embodiment of the present disclosure.

Referring to FIG. 7C, a view illustrates a motion corresponding to a panoramic capture according to an embodiment of the present disclosure.

The electronic device 700 may sense a motion of the electronic device made by the user (e.g., the user's action of moving the electronic device 700 around his/her head while holding the electronic device 700 in his/her hand) using, e.g., a sensor. To describe the instant embodiment of the present disclosure, FIG. 7C illustrates an example in which the electronic device 700 is preset in different positions with respect to the user. The electronic device 700 may be placed in a first position 721, a second position 722, a third position 723, a fourth position 724, a fifth position 725, and a sixth position 726.

The electronic device 700 in the first position 721 may provide the user with a front face image, and thus, provide the user with a mirror function. The first position 721 is a position where the front camera of the electronic device 700 faces the user's front face, and in this position 721, the electronic device 700 may properly provide the user of the electronic device 700 with a mirror function through the front camera of the electronic device 700.

The electronic device 700 in the first position 721 may be moved by the user from the first position 721 through the second position 722 to the sixth position 726 and back to the first position. For example, the electronic device 700 may sense its revolution that starts from the position 721, passes through the second position 722 to the sixth position 726, and returns to the first position. According to an embodiment of the present disclosure, the motion sensor of the electronic device 700 may identify the revolution starting from the first position 721, passing through the second position 722 to the sixth position 726, and returning to the first position 721 as a motion corresponding to the panoramic capture. The electronic device 700 may execute a panoramic mode according to the sequence diagram disclosed in FIG. 7A based on the identified motion corresponding to the panoramic capture.

Meanwhile, the slope of the electronic device 700 may keep on changing when the user makes the revolution. For example, when the user moves the electronic device 700 from the first position 721 to the second position 722 while holding the electronic device 700 in his/her right hand, the electronic device 700 may be tilted in a first direction. Likewise, the slope of the electronic device 700 which is moved from the second position 722 through the third position 723 and the fourth position 724 to the fifth position 725 may be tilted at about 180 degrees as compared with the slope of the electronic device 700 in the first position 721. The slope of the electronic device 700 which has been tilted at about 180 degrees may gradually be reduced as the electronic device 700 moves from the fifth position 725 to the sixth position 726.

As such, the slope of the electronic device 700 may be changed while revolving around the user's head. Accordingly, the respective objects (e.g., the user's head) in the images obtained by the electronic device 700 in the different positions 721 to 726 may have different slopes. The distance between the user and the electronic device 700 may also be changed while the electronic device 700 revolves around the user's head. Accordingly, the respective objects in the images obtained by the electronic device 700 in the different positions 721 to 726 may have different sizes.

Figure 7D:
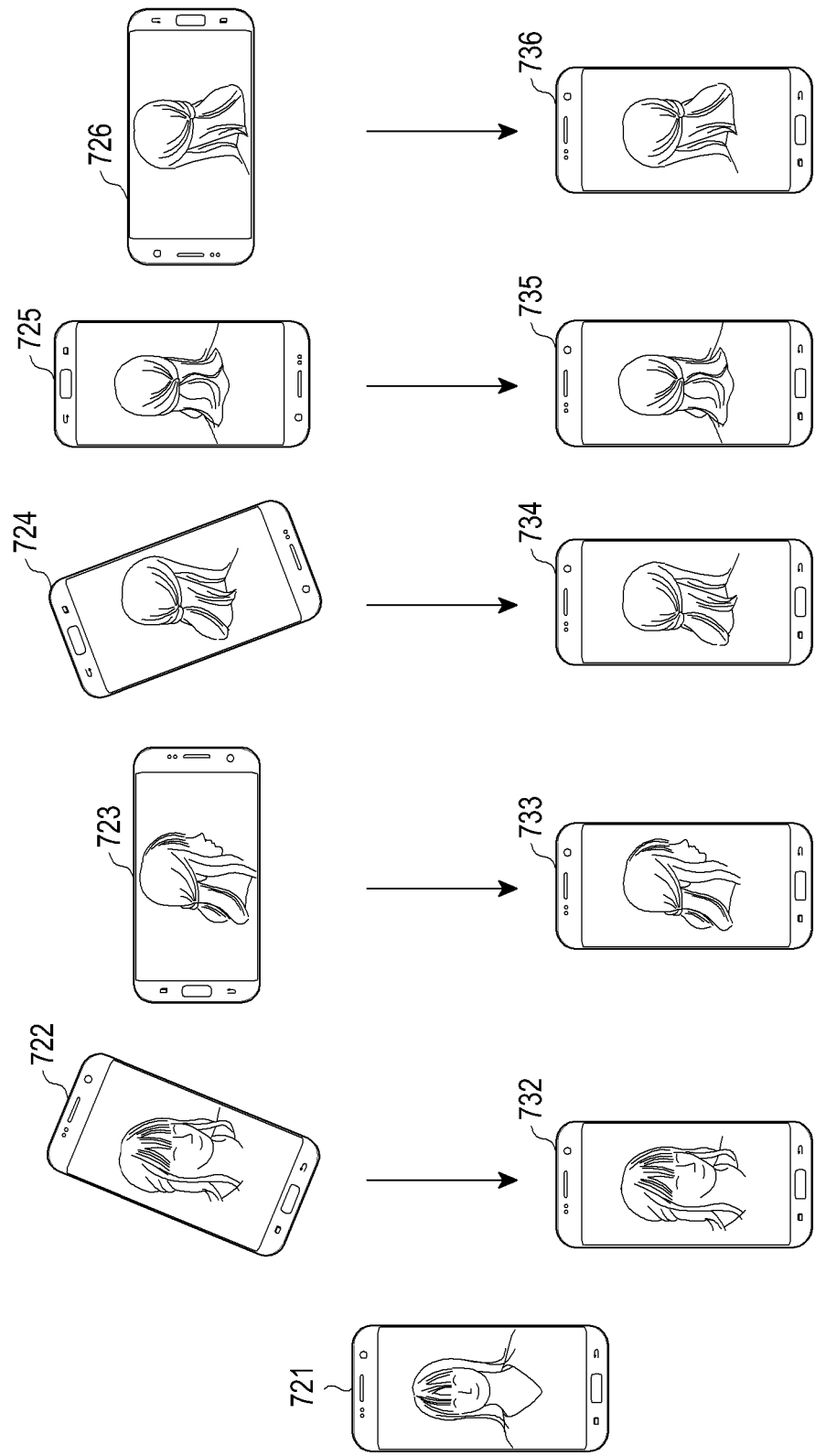

Now described in connection with FIG. 7D is a method for modifying images including objects having different sizes or slopes.

Referring to FIG. 7D, a view illustrates a method for modifying the slope and size of obtained images according to an embodiment of the present disclosure.

The electronic device 700 may obtain a plurality of images through the front camera while revolving around the user's head. The plurality of obtained images may include the user's head captured in different directions. However, since the slope of the electronic device 700 and the distance between the electronic device and the user may keep on changing while the electronic device revolves around the user's head, the user's head included in each of the plurality of obtained images may have a different slope and a different size.

The motion sensor of the electronic device 700 may detect the acceleration, angular speed, and direction of geomagnetic field of the electronic device 700, which correspond to the time that each of the plurality of images is obtained. At least one sensor of the electronic device 700 may detect the distance between the user's head and the electronic device that corresponds to the time that each of the plurality of images is obtained. The electronic device 700 may store in the memory the plurality of images and the acceleration, angular speed, direction of geomagnetic field, and distance between the electronic device and the user's head detected at the time that each of the plurality of images is obtained. The electronic device may measure the size and slope of the user's head included in each of the plurality of obtained images based on the detected acceleration, angular speed, direction of geomagnetic field, and distance between electronic device and user's head.

According to an embodiment of the present disclosure, the electronic device 700 may select the image obtained in the first position 721 as the reference image. For example, the user's head included in the image obtained in the first position 721 may be an upright front face image. The electronic device 700 may load, out of the memory, the acceleration, angular speed, direction of geomagnetic field, and distance between the electronic device and the user's head detected at the time that the reference image is obtained. The image processor 760 of the electronic device may measure the size and slope of the user's head included in the reference image based on the loaded acceleration, angular speed, direction of geomagnetic field, and distance between electronic device and user's head. The electronic device 700 may modify the slope and size of the user's head included in each of the images obtained in the second position 722 through the sixth position 726 based on the slope and size of the user's head measured using the reference image. For example, the image processor 760 of the electronic device 700 may modify the slope and size of the user's head included in each of the images obtained in the second position 722 to the sixth position 726 into the slope and size of the user's head included in each of the images 732 to 736.

Figure 8:
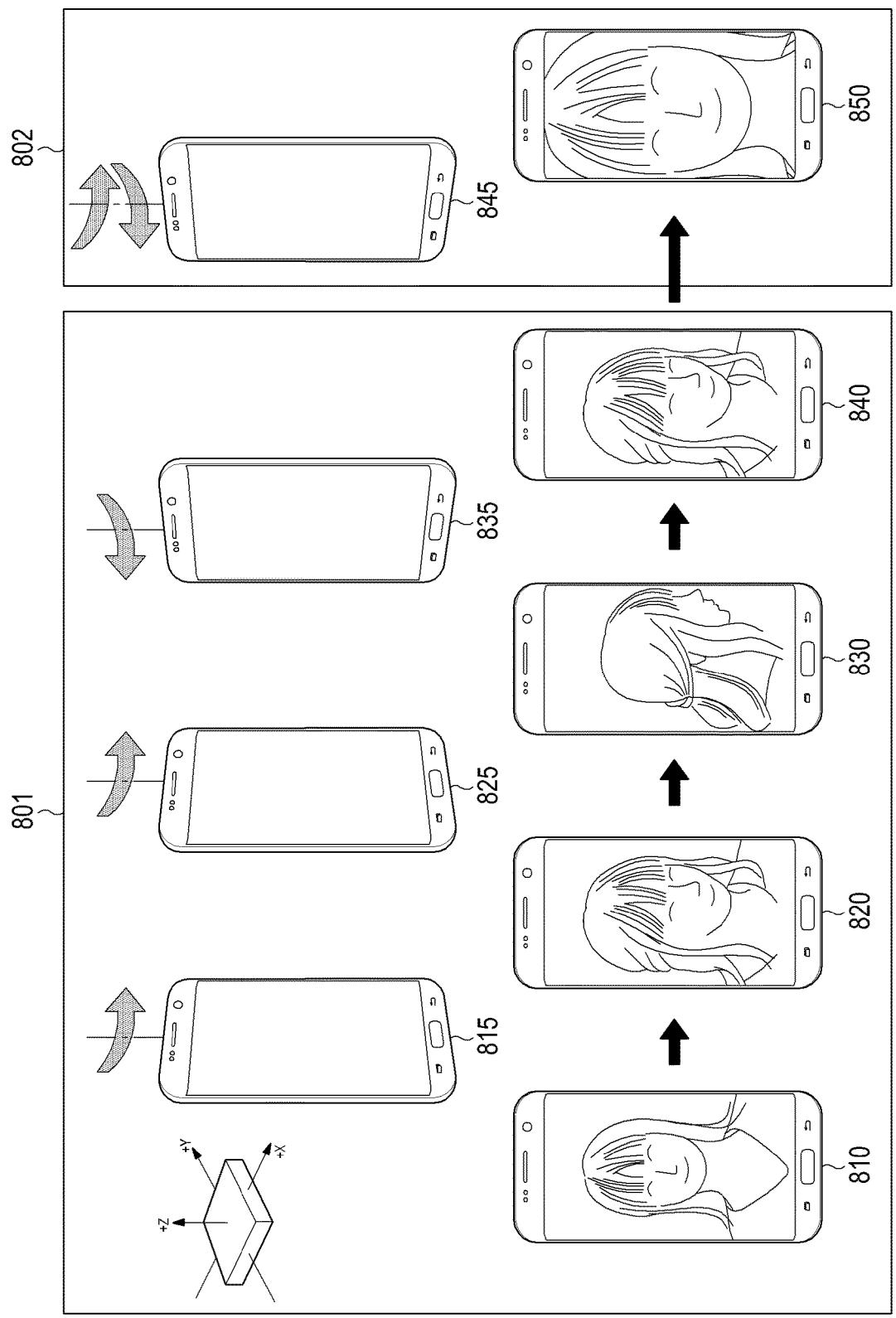
FIG. 8 is a view illustrating panoramic content generated by an electronic device according to an embodiment of the present disclosure.

FIG. 8 is a view illustrating panoramic content generated by an electronic device according to an embodiment of the present disclosure.

Referring to FIG. 8, reference numbers 801 and 802 each refers to panoramic capture generated by a panoramic mode manager (e.g., the panoramic mode manager 730) of the electronic device.

According to an embodiment of the present disclosure, the electronic device may measure the different size and slope of the object included in each of a plurality of images based on the acceleration, angular speed, direction of geomagnetic field, and distance between electronic device and user's head stored in the memory. For example, the slope and size of the object included in each of the plurality of images may be modified to be the same. In this case, each of the plurality of images may include an upright object image captured in a different direction.

The electronic device may generate panoramic capture using the plurality of modified images. The panoramic capture may be a panoramic image in which the plurality of modified images are connected together in order of time of obtaining the plurality of images.

The electronic device may provide the user with a plurality of images obtained in the panoramic mode using the generated panoramic capture. The image 810 may be the user's front face captured through the front camera and may be a basic image among the plurality of images obtained in the panoramic mode.

The electronic device may sense a turn of the electronic device in a first direction as denoted with reference number 815. The motion sensor of the electronic device may sense the turn in the first direction. The electronic device may turn the object included in the image 810 as the object in the image 820 does in response to the turn in the first direction.

The electronic device may sense another turn of the electronic device in the first direction as denoted with reference number 825. The motion sensor of the electronic device may sense the turn in the first direction. The electronic device may turn the object included in the image 820 as the object in the image 830 does in response to the turn in the first direction.

The electronic device may sense a turn of the electronic device in a second direction as denoted with reference number 835. The motion sensor of the electronic device may sense the turn in the second direction. The electronic device may turn the object included in the image 830 as the object in the image 840 does in response to the turn in the second direction.

According to an embodiment of the present disclosure, the electronic device may provide the user with a plurality of images obtained in the panoramic mode using the generated panoramic capture. The image 810 may be the user's front face captured through the front camera and may be a basic image among the plurality of images obtained in the panoramic mode.

The electronic device may sense a turn of the electronic device in the first direction and a turn of the electronic device in the second direction as denoted with reference number 845. The electronic device may sense several shakes of the electronic device to the left and right as denoted with reference number 845. The motion sensor of the electronic device may sense the several shakes of the electronic device to the left and right. The electronic device may enlarge the object in the image 810 as the object in the image 850 does in response to the several shakes of the electronic device to the left and right.

However, it should be appreciated that the present disclosure is not limited to the embodiments and the terminology used herein, and all changes and/or equivalents or replacements thereto also belong to the scope of the present disclosure.

Figure 9A:
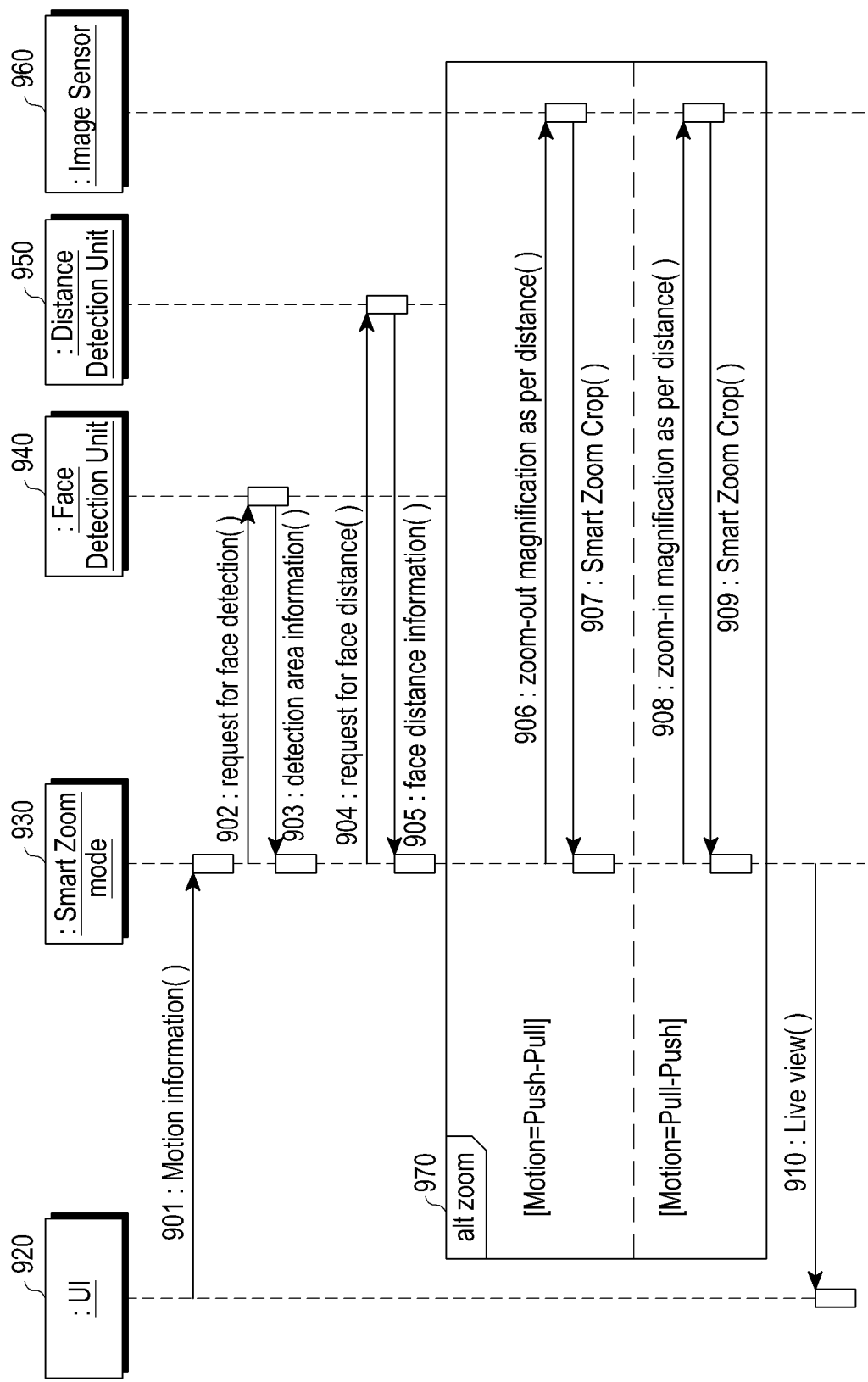
FIGS. 9A and 9B are views illustrating a process for running a smart zoom mode by an electronic device according to an embodiment of the present disclosure.
Figure 9B:
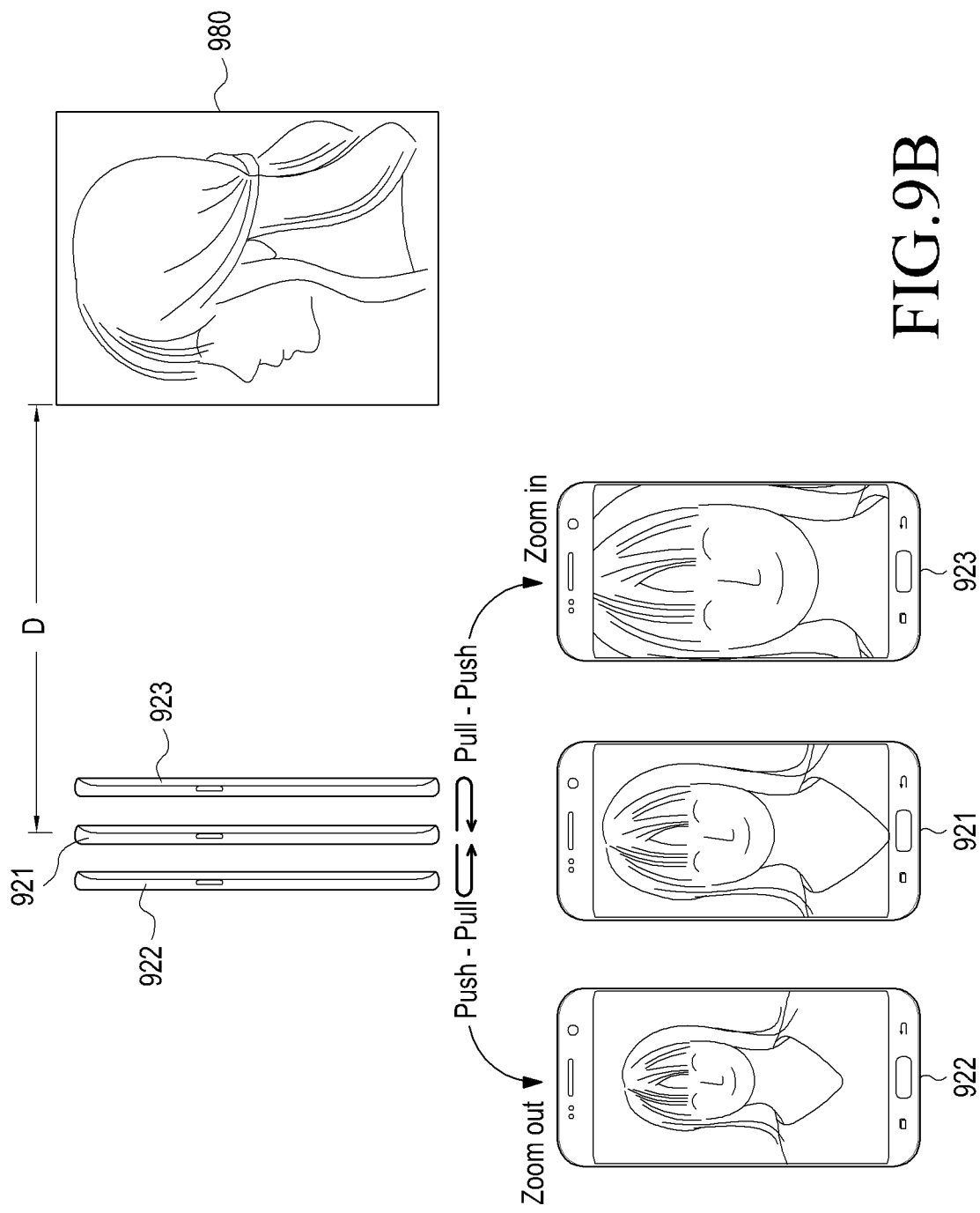

FIGS. 9A and 9B are views illustrating a process for running a smart zoom mode by an electronic device according to an embodiment of the present disclosure.

Referring to FIG. 9A, a sequence diagram is illustrated for describing a process in which a smart zoom mode is executed according to an embodiment of the present disclosure.

Referring to FIGS. 9A and 9B, an electronic device (e.g., the electronic device 101, 102, or 201) may include a processor (e.g., the processor 120 or 210), an image sensor 960 (e.g., the camera module 291), a display (e.g., the display 160 or 260), and a motion sensor (e.g., the sensor module 240).

The processor may include a mode manager (e.g., the mode manager 501), a face detector 940, a distance measurer 950, and a motion analyzer (e.g., the motion analyzer 505). The mode manager of the processor may also include a smart zoom mode manager 930. The smart zoom mode manager 930 included in the processor may mean a program modules (e.g., the program module 310) that manages the smart zoom mode.

According to an embodiment of the present disclosure, the sequence diagram for describing a process for executing the smart zoom mode on the electronic device may include, as objects, a user interface 920, the smart zoom mode manager 930, the face detector 940, the distance measurer 950, and an image sensor 960.

In operation 901, the user interface 920 may transmit information related to a motion of the electronic device to the smart zoom mode manager 930. The smart zoom mode manager 930 may identify whether the received information related to the motion of the electronic device includes a motion corresponding to a smart zoom. For example, the motion corresponding to the smart zoom may be the user's push-pull motion of the electronic device or the user's pull-push motion of the electronic device.

When the motion corresponding to the smart zoom is identified from the received information related to the motion of the electronic device, operation 902 may be performed. In operation 902, the smart zoom mode manager 930 may send a request for face detection to the face detector 940. For example, upon receiving the request for face detection from the smart zoom mode manager 930, the face detector 940 may obtain at least one image through the image sensor 960. The face detector 940 may detect a face from at least one image obtained from the image sensor 960 of the electronic device. When a face is detected from at least one image obtained, the face detector 940 may identify the area where the face is detected. The face detector 940 may generate detection area information including information about the identified area and the detected face. By contrast, when no face is detected from the at least one image obtained from the image sensor 960 of the electronic device, the face detector 940 may generate detection area information including information related to no face being detected.

In operation 903, the face detector 940 may transmit the generated detection area information to the smart zoom mode manager 930. When the received detection area information includes information about the identified area and the detected face, the smart zoom mode manager 950 may request the distance measurer 950 to measure the distance between the electronic device and the detected face.

In operation 904, the smart zoom mode manager 930 may send out the detection area information received from the face detector 940 to request the distance measurer 950 to measure the distance between the electronic device and the detected face. The distance measurer 950 may identify the face targeted for distance measurement based on the detection area information. The distance measurer 950 may measure the distance between the electronic device and the detected face using at least one sensor provided in the electronic device. The distance measurer 950 may generate face distance information including information about the measured distance.

In operation 905, the distance measurer 950 may transmit the generated face distance information to the smart zoom mode manager 930. Upon receiving the detection area information and the face distance information, the smart zoom mode manager 930 may perform the 'alt' operation 970 of determining which motion corresponds to the identified smart zoom. For example, when a push-pull motion of the electronic device corresponds to the identified smart zoom, the smart zoom mode manager 930 may perform operations 906 and 907. In contrast, when a pull-push motion of the electronic device corresponds to the identified smart zoom, the smart zoom mode manager 930 may perform operations 908 and 909. The 'alt' operation means a determination operation when there are several alternative conditions.

When a push-pull motion of the electronic device corresponds to the identified smart zoom, operation 906 may be performed. In operation 906, the smart zoom mode manager 930 may transmit a signal corresponding to the zoom-out to the image sensor 960. For example, when the user makes the motion of pushing and pulling the electronic device while holding the electronic device in his or her hand, the smart zoom mode manager 930 may transmit a signal corresponding to the zoom-out to shrink the image obtained through the image sensor 960. Upon receiving the signal corresponding to the zoom-out, the image sensor 960 may lower the preset magnification and capture an image at the lowered magnification.

In operation 907, the image sensor 960 may crop part of the image captured at the lowered magnification and send the same to the smart zoom mode manager 930. For example, the image sensor 960 may identify the face from the image captured at the lowered mirror magnification. The image sensor 960 may crop part of the captured image to center the identified face in the image. For example, when a push-pull motion of the electronic device corresponds to the identified smart zoom, the electronic device may shrink the preview image displayed on the display.

When a pull-push motion of the electronic device corresponds to the identified smart zoom, operation 908 may be performed. In operation 908, the smart zoom mode manager 930 may transmit a signal corresponding to the zoom-in to the image sensor 960. For example, when the user makes the motion of pulling and pushing the electronic device while holding the electronic device in his or her hand, the smart zoom mode manager 930 may transmit a signal corresponding to the zoom-in to enlarge the image obtained through the image sensor 960. Upon receiving the signal corresponding to the zoom-in, the image sensor 960 may increase the preset magnification and capture an image at the increased magnification.

In operation 909, the image sensor 960 may crop part of the image captured at the increased magnification and send the same to the smart zoom mode manager 930. For example, the image sensor 960 may identify the face from the image captured at the increased mirror magnification. The image sensor 960 may crop part of the captured image to center the identified face in the image. For example, when a pull-push motion of the electronic device corresponds to the identified smart zoom, the electronic device may enlarge the preview image displayed on the display.

In operation 910, the smart zoom mode manager 930 may generate a live view (e.g., a preview image) based on the image received from the image sensor 960. The smart zoom mode manager 930 may transmit the generated live view to the user interface 920. The user interface 920 may display the received live view through the display of the electronic device.

Referring to FIG. 9B, a view is illustrated for describing a process in which a smart zoom mode is executed according to an embodiment of the present disclosure.

An electronic device 921 may provide a user 980 with a mirror function. For example, the electronic device 921 may provide a preview image displayed on the display of the electronic device 921 to the user 980 who is positioned away from the electronic device 921 by D.

The electronic device 921 may enlarge or shrink the preview image displayed on the display of the electronic device 921 while being spaced apart from the user 980 by D. For example, the electronic device 921 may sense a push-pull motion of the electronic device 921. The electronic device 921 may identify the push-pull motion made on the electronic device through a motion sensor. The electronic device 921 may shrink the preview image being displayed on the display as the electronic device 922 does in response to the identified push-pull motion. The electronic device 921 may also sense a pull-push motion of the electronic device 921. The electronic device 921 may identify the pull-push motion made on the electronic device through the motion sensor. The electronic device 921 may enlarge the preview image being displayed on the display as the electronic device 923 does in response to the identified pull-push motion.

Figure 10A:
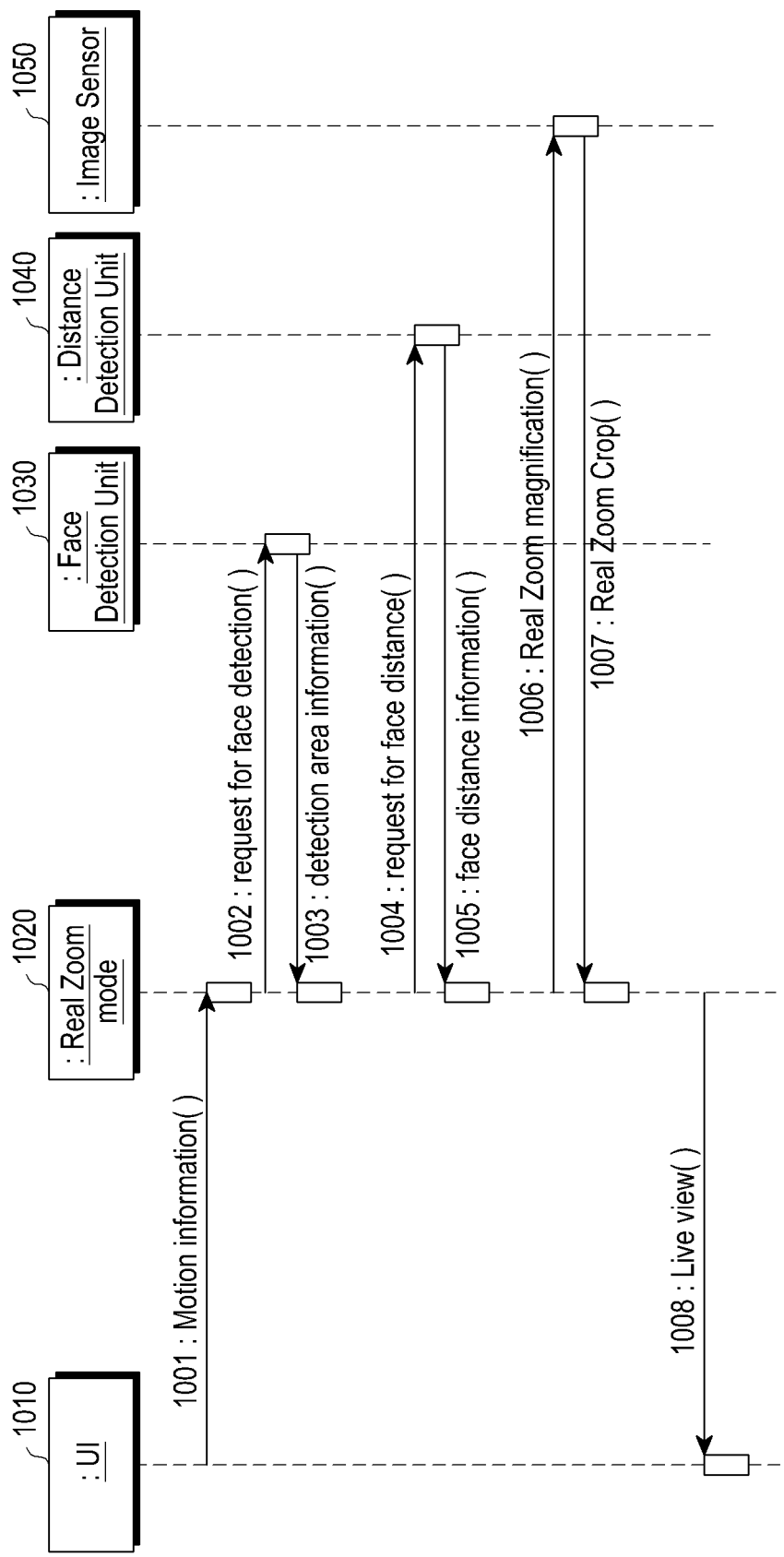
FIGS. 10A and 10B are views illustrating a process for running a real zoom mode by an electronic device according to an embodiment of the present disclosure.
Figure 10B:
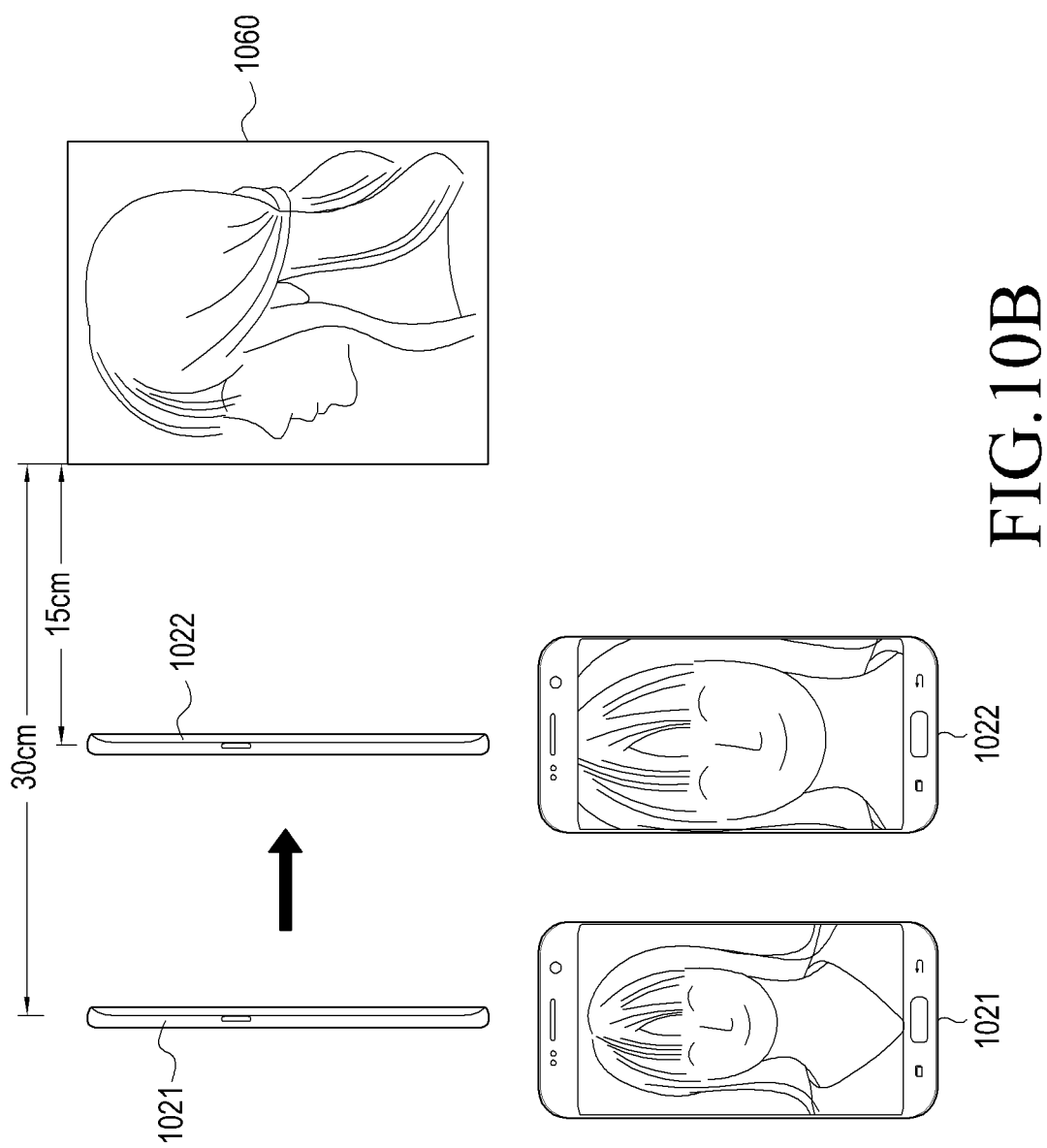

FIGS. 10A and 10B are views illustrating a process for running a real zoom mode by an electronic device according to an embodiment of the present disclosure.

Referring to FIG. 10A, a sequence diagram is illustrated for describing a process in which a real-zoom mode is executed according to an embodiment of the present disclosure.

According to an embodiment of the present disclosure, an electronic device (e.g., the electronic device 101, 102, or 201) may include a processor (e.g., the processor 120 or 210), an image sensor 1050 (e.g., the camera module 291), a display (e.g., the display 160 or 260), and a motion sensor (e.g., the sensor module 240).

The processor may include a mode manager (e.g., the mode manager 501), a face detector 1030, a distance measurer 1040, and a motion analyzer (e.g., the motion analyzer 505). The mode manager of the processor may also include a real-zoom mode manager 1020. The real-zoom mode manager 1020 included in the processor may mean a program modules (e.g., the program module 310) that manages the real zoom mode.

According to an embodiment of the present disclosure, the sequence diagram for describing a process for executing the real zoom mode on the electronic device may include, as objects, a user interface 1010, the real-zoom mode manager 1020, the face detector 1030, the distance measurer 1040, and an image sensor 1050.

In operation 1001, the user interface 1010 may transmit information related to a motion of the electronic device to the real-zoom mode manager 1020. The real-zoom mode manager 1020 may identify whether the received information related to the motion of the electronic device includes part of a motion corresponding to a real zoom. For example, the motion corresponding to the real zoom may be the motion of the electronic device being stationary for a preset time or longer with the mirror function executed. The motion corresponding to the real zoom may be the motion of the electronic device moving in a direction where the user's front face is positioned or in a second direction which is an opposite direction of the first direction, with the user's front face detected through the face detector 1030. Accordingly, upon determining that the electronic device remains stationary for the preset time or longer with the mirror function executed, the real-zoom mode manager 1020 may perform operation 1002.

In operation 1002, the real-zoom mode manager 1020 may send a request for face detection to the face detector 1030. For example, upon receiving the request for face detection from the real-zoom mode manager 1020, the face detector 1030 may obtain at least one image through the image sensor 1050. The face detector 1030 may detect a face from at least one image obtained from the image sensor 1050 of the electronic device. When a face is detected from at least one image obtained, the face detector 1030 may identify the area where the face is detected. The face detector 1030 may generate detection area information including information about the identified area and the detected face. By contrast, when no face is detected from the at least one image obtained from the image sensor 960 of the electronic device, the face detector 1030 may generate detection area information including information related to no face being detected.

In operation 1003, the face detector 1030 may transmit the generated detection area information to the real-zoom mode manager 1020. When the received detection area information includes information about the identified area and the detected face, the real-zoom mode manager 1020 may request the distance measurer 1040 to measure the distance between the electronic device and the detected face.

In operation 1004, the real-zoom mode manager 1020 may send out the detection area information received from the face detector 1030 to request the distance measurer 1040 to measure the distance between the electronic device and the detected face. The distance measurer 1040 may identify the face targeted for distance measurement based on the detection area information. The distance measurer 1040 may measure the distance between the electronic device and the detected face using at least one sensor provided in the electronic device. The distance measurer 1040 may generate face distance information including information about the measured distance.

In operation 1005, the distance measurer 1040 may transmit the generated face distance information to the real-zoom mode manager 1020. The real-zoom mode manager 1020 may resize the preview image displayed on the display based on the received detection area information and face distance information. For example, the real-zoom mode manager 1020 may resize the preview image displayed on the display into the size of an image shown on a real physical mirror that is positioned away by the same distance as the measured distance. To that end, the real-zoom mode manager 1020 may generate a signal for adjusting the magnification of the image sensor 1050.

In operation 1006, the real-zoom mode manager 1020 may transmit information related to a real zoom magnification to the image sensor 1050. For example, the real-zoom mode manager 1020 may transmit a signal corresponding to the zoom-in or zoom-out to the image sensor. When the distance between the electronic device and the detected face measured by the distance measurer 1040 decreases, the real-zoom mode manager 1020 may transmit a signal corresponding to the zoom-in to the image sensor 1050. In other words, when the front camera of the electronic device comes closer to the face, the real-zoom mode manager 1020 may transmit a signal corresponding to the zoom-in to the image sensor 1050 to enlarge the preview image displayed on the display.

When the distance between the electronic device and the detected face measured by the distance measurer 1040 increases, the real-zoom mode manager 1020 may transmit a signal corresponding to the zoom-out to the image sensor 1050. In other words, when the front camera of the electronic device goes further away from the face, the real-zoom mode manager 1020 may transmit a signal corresponding to the zoom-out to the image sensor 1050 to shrink the preview image displayed on the display.

In operation 1007, the image sensor 1050 may capture at least one image at a higher or lower magnification in response to the zoom-in or zoom-out corresponding signal received from the real-zoom mode manager 1020. The image sensor 1050 may crop part of the at least one image captured and then send the same to the real-zoom mode manager 1020. For example, the image sensor 1050 may identify the face from the image captured at the higher or lower magnification. The image sensor 1050 may crop part of the captured image to center the identified face in the image. The image sensor 1050 may transmit the at least one image cropped to the real-zoom mode manager 1020.

In operation 1008, the real-zoom mode manager 1020 may generate a live view (e.g., a preview image) based on the image received from the image sensor 1050. The real-zoom mode manager 1020 may transmit the generated live view to the user interface 1010. The user interface 1010 may display the received live view through the display of the electronic device.

Referring to FIG. 10B, a view is illustrated for describing a process in which a real zoom mode is executed according to an embodiment of the present disclosure.

An electronic device 1021 may provide a user 1060 with a mirror function. For example, the electronic device 1021 may provide a preview image displayed on the display of the electronic device 1021 to the user 1060 who is positioned away from the electronic device 1021 by 30 cm. The preview image displayed on the display of the electronic device 1021 positioned away from the face of the user 1060 by 30 cm may be resized into the same size as a face shown on a real physical mirror positioned 30 cm away from the face of the user 1060.

The electronic device 1022 may provide a user 1060 with a mirror function. For example, the electronic device 1021 may provide a preview image displayed on the display of the electronic device 1021 to the user 1060 who is positioned away from the electronic device 1021 by 15 cm. The preview image displayed on the display of the electronic device 1022 positioned away from the face of the user 1060 by 15 cm may be resized into the same size as a face shown on a real physical mirror positioned 15 cm away from the face of the user 1060.

When the user 1060 brings the electronic device closer to the user's face while facing the front camera and display of the electronic device, the preview image displayed on the display may be enlarged. For example, the size of the preview image displayed on the display of the electronic device 1022 may be larger than the size of the preview image displayed on the display of the electronic device 1021.

Figure 11:
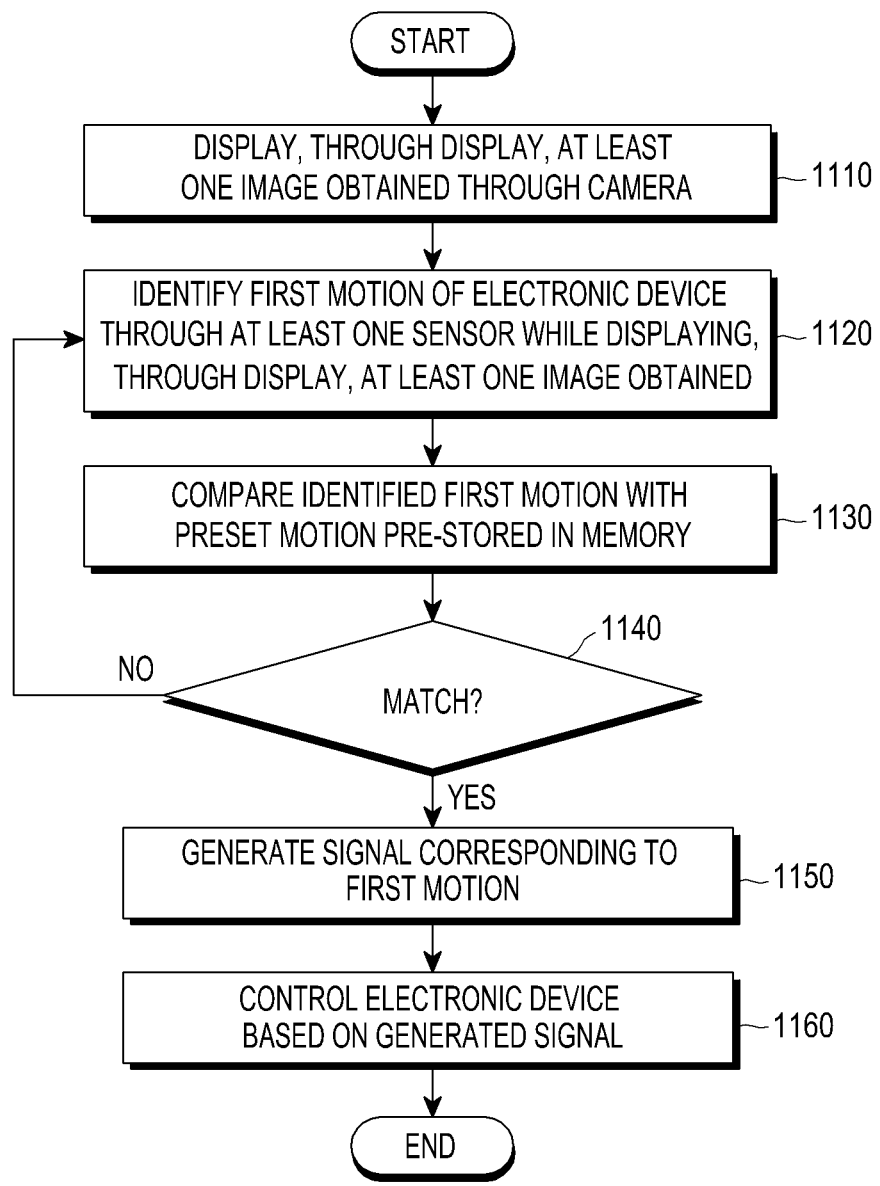
FIG. 11 is a flowchart illustrating a process for performing a mirror function by an electronic device according to an embodiment of the present disclosure.

FIG. 11 is a flowchart illustrating a process for performing a mirror function by an electronic device according to an embodiment of the present disclosure.

Referring to FIG. 11, in operation 1110, the processor of the electronic device may display, through the display, at least one image obtained through the camera. At least one of the camera and the display may be a device that is provided in the electronic device and electrically connected with the processor of the electronic device. At least one of the camera and the display may be an independent device that may wiredly or wirelessly communicate data with the electronic device. For example, the independent camera device may obtain at least one image and send the at least one image obtained to the electronic device according to an embodiment of the present disclosure. According to an embodiment of the present disclosure, the electronic device may display the at least one image obtained through an independent display.

In operation 1120, the processor of the electronic device may identify a first motion of the electronic device or the independent camera device through at least one sensor while displaying, through the display, the at least one image obtained.

In operation 1130, the processor of the electronic device may compare the identified first motion with a preset motion previously stored in the memory. For example, the memory of the electronic device may store information about a preset motion. The processor of the electronic device may determine whether the identified first motion matches some of the preset motions.

In operation 1140, when the identified first motion matches some of the preset motions, operation 1150 may be performed. In operation 1150, the processor of the electronic device may generate a signal corresponding to the first motion.

In operation 1160, the processor of the electronic device may control the electronic device based on the generated signal. When at least one of the camera and the display is an independent device that may wiredly or wirelessly communicate data with the electronic device, the processor of the electronic device may control the independent camera device or the independent display device based on the generated signal. For example, when the signal generated corresponding to the first motion is a signal for changing the size of the preview image displayed on the display, the processor of the electronic device may change the size of the preview image displayed through the display of the electronic device or the independent display device.

In operation 1140, unless the identified first motion matches some of the preset motions, operation 1120 may be performed again.

Figure 12:
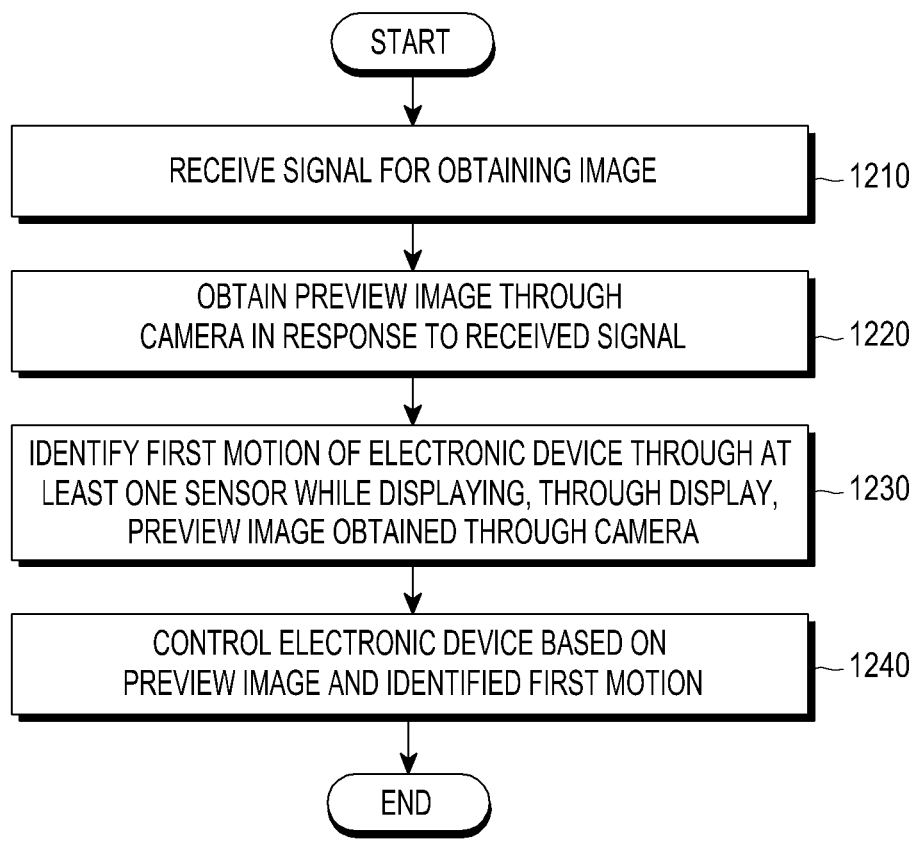
FIG. 12 is a flowchart illustrating a process for performing a mirror function by an electronic device according to an embodiment of the present disclosure.

FIG. 12 is a flowchart illustrating a process for performing a mirror function by an electronic device according to an embodiment of the present disclosure.

Referring to FIG. 12, an electronic device (e.g., the electronic device 101, 102, or 201) may include a processor (e.g., the processor 120 or 210), a camera (e.g., the camera module 291), a display (e.g., the display 160 or 260), and a motion sensor (e.g., the sensor module 240).

In operation 1210, the processor of the electronic device may receive a signal for obtaining an image. The camera of the electronic device may be activated based on a signal corresponding to the execution of the camera and received from the user or a signal corresponding to a motion of the electronic device. For example, when the user runs an application that requires execution of the camera, the camera may be activated. When the electronic device senses a preset motion, the camera may be activated.

In operation 1220, the processor of the electronic device may obtain a preview image through the camera of the electronic device in response to the received signal. "Preview image" means an image that is displayed on the display when the user takes an image of at least one object using the camera of the electronic device. The preview image obtained through the camera may be displayed in real-time on the display. The user may take an image of at least one object while viewing the preview image displayed on the display.

In operation 1230, the processor of the electronic device may identify a motion of the electronic device or the independent camera device through at least one sensor while displaying, through the display, the preview image obtained through the camera.

In operation 1240, the processor of the electronic device may control the electronic device based on the preview image and the motion identified for the electronic device.

According to an embodiment of the present disclosure, a method for obtaining an image through an electronic device may comprise receiving a signal for obtaining an image, obtaining a preview image through a camera in response to the received signal, identifying a first motion of the electronic device through at least one sensor while the preview image obtained through the camera is displayed through a display, and controlling the electronic device based on the identified first motion and the preview image.

According to an embodiment of the present disclosure, the method may further comprise obtaining a plurality of images for a first object outside the electronic device through the camera based on the identified first motion, identifying a slope of the electronic device or a distance between the electronic device and the first object corresponding to a time when some of the plurality of images are obtained, and storing information about the slope or the distance in a memory in association with the at least some images.

According to an embodiment of the present disclosure, the method may further comprise changing a slope or size of the first object included in the at least some images based on the slope or the distance.

According to an embodiment of the present disclosure, the method may further comprise selecting one of the plurality of images as a reference image and changing a slope or size of the first object included in the at least some images based on the slope or size of the first object included in the selected reference image.

According to an embodiment of the present disclosure, the method may further comprise changing a slope or size of the first object included in the at least some images, generating a first image including the at least some images with the slope or size of the first object changed, and displaying a second image included in the first image through the display.

According to an embodiment of the present disclosure, the method may further comprise identifying a second motion of the electronic device through the at least one sensor while the second image is displayed through the display, and changing the second image displayed on the display to a third image included in the first image in response to the identified second motion of the electronic device.

According to an embodiment of the present disclosure, the method may further comprise identifying a second motion of the electronic device through the at least one sensor while the second image is displayed through the display and changing a size of the second image displayed on the display in response to the identified second motion of the electronic device.

According to an embodiment of the present disclosure, the method may comprise when the identified first motion matches a preset second motion, changing the preview image obtained through the camera into a first scale and displaying the changed preview image on the display and when the identified first motion matches a preset third motion, changing the preview image obtained through the camera into a second scale and displaying the changed preview image on the display.

According to an embodiment of the present disclosure, the method may comprise determining whether an image of a front face is detected through the camera, when the image of the front face is detected, measuring a distance between the electronic device and the front face, resizing the detected image of the front face based on the measured distance, and displaying the resized image of the front face through the display.

According to an embodiment of the present disclosure, there may be provided a computer readable recording medium storing a program for executing a method for obtaining an image through an electronic device, the method comprising receiving a signal for obtaining an image, obtaining a preview image through a camera in response to the received signal, identifying a first motion of the electronic device through at least one sensor while the preview image obtained through the camera is displayed through a display, and controlling the electronic device based on the identified first motion and the preview image.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

As is apparent from the foregoing description, according to various embodiments of the present disclosure, the mirror function of the electronic device may allow the user to feel like he or she uses a real physical mirror.

According to various embodiments of the present disclosure, the electronic device may obtain information about the electronic device and an object and a motion of the electronic device while providing a mirror function to the user. The electronic device may also modify the image being displayed on the display based on the obtained information.

According to various embodiments of the present disclosure, the electronic device may identify a motion of the user or electronic device through the motion sensor and perform an operation corresponding to the identified motion. This allows for the user's one-handed resetting of the image being displayed on the display.

According to various embodiments of the present disclosure, the electronic device may provide a mirror function that is capable of blind spot capturing. The electronic device enables the capture and view of a blind spot that a real physical mirror cannot.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a display;
   a camera;
   at least one sensor; and
   a processor electrically connected with the display, the camera, and the at least one sensor, wherein the processor is configured to:
      receive a signal for obtaining an image,
      obtain a preview image through the camera in response to the received signal,
      identify a first motion of the electronic device through the at least one sensor while the preview image obtained through the camera is displayed through the display, and
   in response to the first motion being a first preset motion:
      obtain a plurality of images comprising a first object through the camera,
      identify orientations of the electronic device each corresponding to times when the plurality of images are obtained, respectively,
      change orientations of the first object in the plurality of images based on the identified orientations of the electronic device, and
      display at least one image from among the plurality of images comprising the first object of which the orientations are changed through the display.

2. The electronic device of claim 1, wherein the processor is further configured to:
   identify distances between the electronic device and the first object each corresponding to the times when the plurality of images are obtained, and
   store information about the identified orientations and the identified distances of the electronic device in a memory in association with the plurality of images.

3. The electronic device of claim 2, wherein the processor is further configured to change magnifications for the first object included in the plurality of images based on the identified distances.

4. The electronic device of claim 1, wherein the processor is further configured to:
   select one of the plurality of images as a reference image, and
   change the orientations of the first object included in the plurality of images based on an orientation of the first object included in the selected reference image.

5. The electronic device of claim 3, wherein the processor is further configured to:
   display one of the plurality of images comprising the first object of which the orientations and magnifications are changed through the display.

6. The electronic device of claim 5, wherein the processor is further configured to:
   identify a second motion of the electronic device through the at least one sensor while the one of the plurality of images is displayed through the display, and
   display another one of the plurality of images corresponding to the identified second motion of the electronic device in place of the one of the plurality of images.

7. The electronic device of claim 5, wherein the processor is further configured to:
   identify a second motion of the electronic device through the at least one sensor while the one of the plurality of images is displayed through the display, and
   change a magnification of the one of the plurality of images displayed on the display in response to the identified second motion of the electronic device.

8. The electronic device of claim 1, wherein the processor is further configured to:
   change, when the first motion matches a preset second motion, the preview image obtained through the camera into a first scale and display the changed preview image on the display, and
   change, when the first motion matches a preset third motion, the preview image obtained through the camera into a second scale and display the changed preview image on the display.

9. The electronic device of claim 1, wherein the processor is further configured to:
   determine whether an image of a front face is detected through the camera,
   measure, when the image of the front face is detected, a distance between the electronic device and the front face,
   resize the detected image of the front face based on the measured distance, and
   display the resized image of the front face through the display.

10. A method for obtaining an image through an electronic device, the method comprising:
   receiving a signal for obtaining an image;
   obtaining a preview image through a camera in response to the received signal;
   identifying a first motion of the electronic device through at least one sensor while the preview image obtained through the camera is displayed through a display; and
   in response to the first motion being a first preset motion:
      obtaining a plurality of images comprising a first object through the camera,
      identifying orientations of the electronic device each corresponding to times when the plurality of images are obtained, respectively,
      changing orientations of the first object in the plurality of images based on the identified orientations of the electronic device, and
      displaying at least one image from among the plurality of images comprising the first object of which the orientations are changed through the display.

11. The method of claim 10, further comprising:
   identifying distances between the electronic device and the first object each corresponding to the times when the plurality of images are obtained; and
   storing information about the identified orientations and the identified distances of the electronic device in a memory in association with the plurality of images.

12. The method of claim 11, further comprising changing magnifications for the first object included in the plurality of images based on the identified distances.

13. The method of claim 10, further comprising:
   selecting one of the plurality of images as a reference image; and
   changing the orientations of the first object included in the plurality of images based on the orientations of the first object included in the selected reference image.

14. The method of claim 12, further comprising:
   displaying one of the plurality of images comprising the first object of which the orientations and magnifications are changed through the display.

15. The method of claim 14, further comprising:
   identifying a second motion of the electronic device through the at least one sensor while the one of the plurality of images is displayed through the display; and display another one of the plurality of images corresponding to the identified second motion of the electronic device in place of the one of the plurality of images.

16. The method of claim 14, further comprising:
identifying a second motion of the electronic device through the at least one sensor while the one of the plurality of images is displayed through the display; and
changing a magnification of the one of the plurality of images displayed on the display in response to the identified second motion of the electronic device.

17. The method of claim 10, further comprising:
changing, when the first motion matches a preset second motion, the preview image obtained through the camera into a first scale and displaying the changed preview image on the display; and
changing, when the first motion matches a preset third motion, the preview image obtained through the camera into a second scale and displaying the changed preview image on the display.

18. The method of claim 10, further comprising:
determining whether an image of a front face is detected through the camera;
measuring, when the image of the front face is detected, a distance between the electronic device and the front face;
resizing the detected image of the front face based on the measured distance; and
displaying the resized image of the front face through the display.

19. At least one non-transitory computer readable recording medium configured to store a program for executing a method for obtaining an image through an electronic device, the method comprising:
receiving a signal for obtaining an image;
obtaining a preview image through a camera in response to the received signal;
identifying a first motion of the electronic device through at least one sensor while the preview image obtained through the camera is displayed through a display; and
in response to the first motion being a first preset motion:
obtaining a plurality of images comprising a first object through the camera,
identifying orientations of the electronic device each corresponding to times when the plurality of images are obtained, respectively,
changing orientations of the first object in the plurality of images based on the identified orientations of the electronic device, and
displaying at least one image from among the plurality of images comprising the first object of which the orientations are changed through the display.

20. The electronic device of claim 2, wherein the processor is further configured to detect an acceleration, angular speed, and direction of geomagnetic field of the electronic device.

* * * * *